(12) United States Patent
Hodrinsky et al.

(10) Patent No.: US 10,827,584 B2
(45) Date of Patent: Nov. 3, 2020

(54) LED CONTROL CIRCUITS

(71) Applicant: LiteIdeas, LLC, Forest, VA (US)

(72) Inventors: Todd Hodrinsky, Mansfield Center, CT (US); James Epperson, Ararat, VA (US); Calvin McCoy Winey, III, Peterborough, NH (US); Karl Kenneth Karash, Berlin, MA (US); Michael Varanka, Amherst, NH (US)

(73) Assignee: LiteIdeas, LLC, Forest, VA (US)

( * ) Notice: Subject to any disclaimer, the term of this patent is extended or adjusted under 35 U.S.C. 154(b) by 0 days.

(21) Appl. No.: 16/396,620

(22) Filed: Apr. 26, 2019

(65) Prior Publication Data

US 2019/0335554 A1  Oct. 31, 2019

Related U.S. Application Data

(60) Provisional application No. 62/663,784, filed on Apr. 27, 2018, provisional application No. 62/667,877, filed on May 7, 2018, provisional application No. 62/741,500, filed on Oct. 4, 2018, provisional application No. 62/775,867, filed on Dec. 5, 2018.

(51) Int. Cl.
| | |
|---|---|
| *H05B 39/04* | (2006.01) |
| *H05B 39/00* | (2006.01) |
| *H05B 45/37* | (2020.01) |
| *H02M 1/42* | (2007.01) |

(Continued)

(52) U.S. Cl.
CPC .......... *H05B 45/37* (2020.01); *H02M 1/4208* (2013.01); *H02M 7/219* (2013.01); *H02M 7/2173* (2013.01)

(58) Field of Classification Search
CPC combination set(s) only.
See application file for complete search history.

(56) References Cited

U.S. PATENT DOCUMENTS

| | | | |
|---|---|---|---|
| 2016/0087523 A1* | 3/2016 | Liu | H02M 3/33507 363/21.12 |
| 2017/0142791 A1* | 5/2017 | Millar | H05B 45/46 |
| 2018/0110101 A1 | 4/2018 | Kottritsch et al. | |

OTHER PUBLICATIONS

International Search Report and Written Opinion for Application No. PCT/US2019/029506, dated Aug. 27, 2019, 18 pages.

(Continued)

*Primary Examiner* — Minh D A
(74) *Attorney, Agent, or Firm* — Brake Hughes Bellermann LLP

(57) ABSTRACT

A system for controlling a load including a plurality of LEDs includes a timing circuit, an encoder and a configuration switching circuit. The timing circuit generates time-off switching points and time-on switching points. The encoder generates a load voltage by modifying a rectified line voltage using the time-off switching points and the time-on switching points. The configuration switching circuit determines a maximum voltage of a line voltage input to the driver system, selects a configuration for the plurality of LEDs based on the maximum voltage, communicates the configuration for the plurality of LEDs to the load, dynamically reconfigures the configuration for the plurality of LEDs based on the modified rectified line voltage, the dynamically reconfiguration of the configuration including changing at least one of the first quantity of LEDs in electrically coupled in series and the second quantity of LEDs electrically coupled in parallel.

18 Claims, 27 Drawing Sheets

(51) Int. Cl.
*H02M 7/217* (2006.01)
*H02M 7/219* (2006.01)

(56) References Cited

OTHER PUBLICATIONS

Invitation to Pay Additional Fees and Partial International Search for International Application No. PCT/US2019/029506, dated Jul. 3, 2019, 12 pages.

* cited by examiner

Line Voltage (10)

Rectified Line Voltage (15)

Rectified Line Voltage (15)

Load Voltage (20)

Load Voltage (20)

Load Voltage (20)

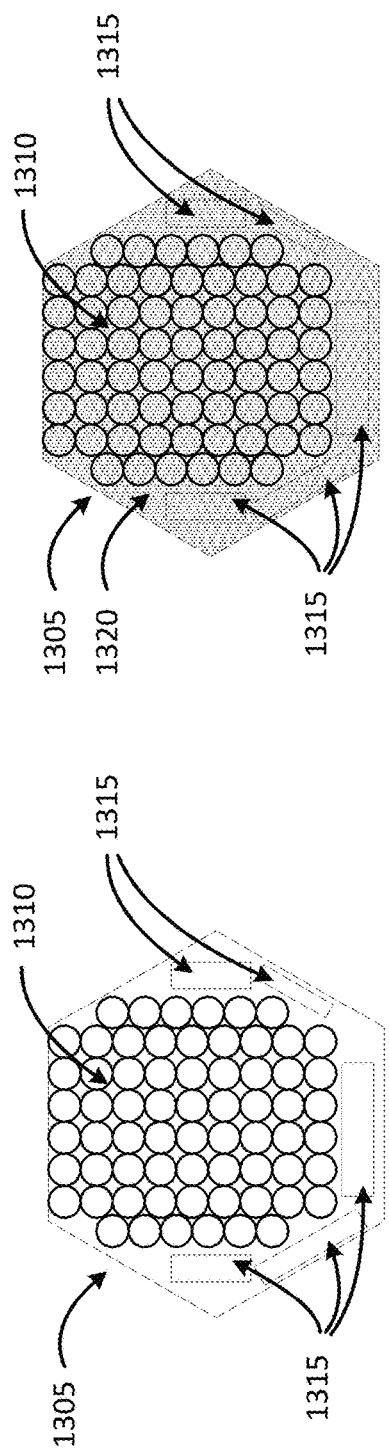
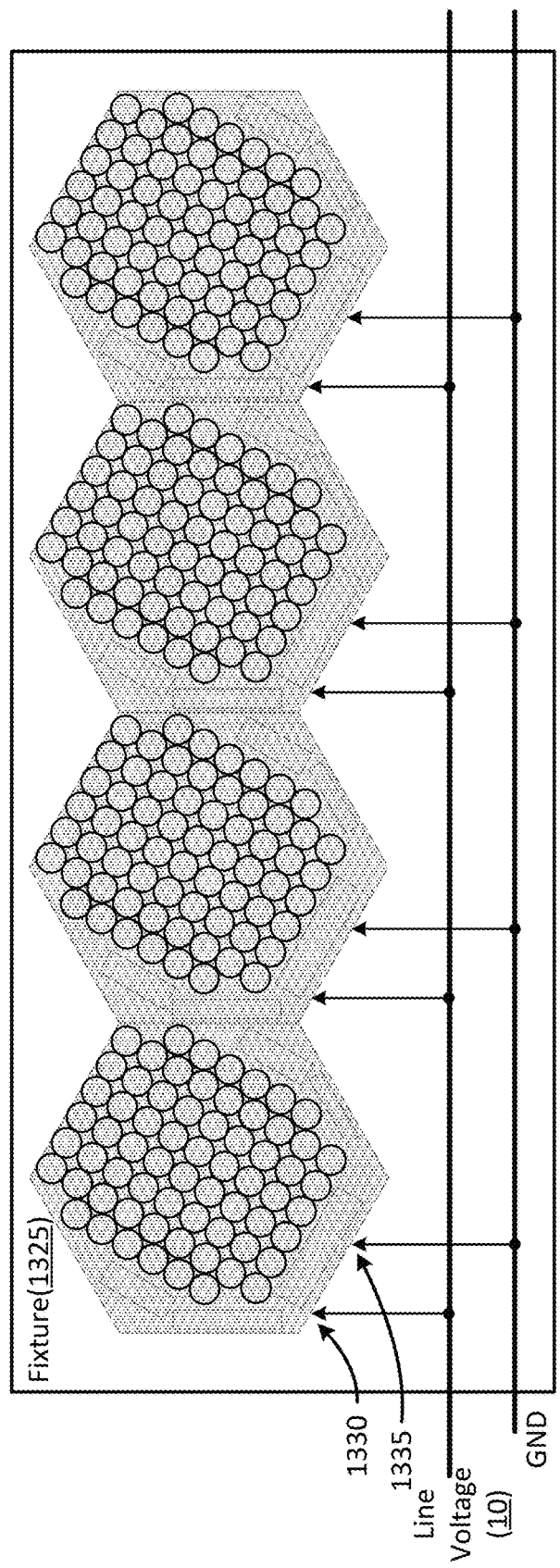
FIG. 13A
FIG. 13B
FIG. 13C

LED CONTROL CIRCUITS

CROSS REFERENCE TO RELATED APPLICATION(S)

This application is a Nonprovisional of, and claims priority to, U.S. Patent Application No. 62/663,784, filed Apr. 27, 2018, entitled "LED CONTROL CIRCUITS"; U.S. Patent Application No. 62/667,877, filed May 7, 2018, entitled "MODULAR LED FIXTURE"; U.S. Patent Application No. 62/741,500, filed Oct. 4, 2018, entitled "LED CONTROL CIRCUITS"; and U.S. Patent Application No. 62/775,867, filed Dec. 5, 2018, entitled "FLICKER CONTROL IN AN LED MESH", each of which is incorporated by reference herein in its entirety.

FIELD

Embodiments relate to light emitting diode (LED) light fixtures and circuits configured to control the LED's.

BACKGROUND

Semiconductor-based lighting can use light-emitting diodes (LEDs). LEDs can be more efficient that traditional (e.g., incandescent and/or florescent) lighting. For example, LED-based lighting can last thousands of hours longer even than fluorescent lighting, while consuming far fewer watts per lumen. LEDs have a minimum forward voltage that must be applied before the LEDs begin to emit light. If being driven by a sinusoidal voltage waveform (e.g., alternating current line voltages) LEDs can have gaps in light transmission when the voltage waveform drops below the forward voltages of the LED. This can reduce the overall light output of the LED-based lighting and/or less than optimal light transmission efficiency.

SUMMARY

Example implementations describe systems to control lighting loads including a plurality of light emitting diodes (LED).

In a general aspect a system for controlling a load including a plurality of LEDs includes a timing circuit, an encoder and a configuration switching circuit. The timing circuit is configured to generate time-off switching points and time-on switching points. The encoder is configured to generate a load voltage by modifying a rectified line voltage using the time-off switching points and the time-on switching points. The configuration switching circuit is configured to determine a maximum voltage of a line voltage input to the driver system, select a configuration for the plurality of LEDs based on the maximum voltage, the configuration including at least one of a first quantity of LEDs in electrically coupled in series and a second quantity of LEDs electrically coupled in parallel. The configuration switching circuit is further configured to communicate the configuration for the plurality of LEDs to the load, dynamically reconfigure the configuration for the plurality of LEDs based on the modified rectified line voltage, and communicate the reconfigured configuration for the plurality of LEDs to the load during at least one cycle of the rectified line voltage. The dynamically reconfiguration of the configuration includes changing at least one of the first quantity of LEDs in electrically coupled in series and the second quantity of LEDs electrically coupled in parallel.

Implementations can include one or more of the following features. For example, the driver system can further include a direct current (DC) source electrically coupled to the load voltage, wherein the DC source is configured to prevent flicker by maintaining the load voltage above a turn-on voltage of the plurality of LEDs. The driver system can further include a direct current (DC) source electrically coupled to the load voltage and an AC-DC converter configured to charge the DC source using the load voltage during a reconfiguration of the plurality of LEDs. The driver system can further include a sensor circuit configured to detect a voltage level associated with at least one of the line voltage and the rectified line voltage and communicate the detected voltage level to the encoder and the encoder can dynamically regenerate the time-off switching points and the time-on switching points based on the detected voltage level.

For example, the driver system can further include a sensor circuit configured to detect a voltage level associated with at least one of the line voltage and the rectified line voltage and communicate the detected voltage level to the configuration switching circuit and the configuration switching circuit can dynamically reconfigure the configuration for the plurality of LEDs based on the detected voltage level. The driver system can further include a look-up table and a sensor circuit configured to detect a voltage level associated with at least one of the line voltage and the rectified line voltage and communicate the detected voltage level to the configuration switching circuit, the configuration switching circuit can store the detected voltage level in the look-up table. The driver system can further include a look-up table storing a plurality of voltage levels associated with at least one of the line voltage and the rectified line voltage and the configuration switching circuit can dynamically reconfigure the configuration for the plurality of LEDs based on the stored plurality of voltage levels.

For example, the driver system can include a control signal generation circuit configured to receive a signal indicating a variable light output setting and communicate a control signal to the timing circuit. The control signal can cause the timing circuit to one of generate additional off periods to reduce power associated with the load voltage, the reduced power causing the plurality of LEDs to dim, generate longer off periods to reduce power associated with the load voltage, the reduced power causing the plurality of LEDs to dim, remove off periods to increase power associated with the load voltage, the increased power causing the plurality of LEDs to get brighter, and/or generate shorter off periods to increase power associated with the load voltage, the increased power causing the plurality of LEDs to get brighter.

For example, the driver system can further include a control signal generation circuit configured to receive a signal indicating an environmental lighting condition, generate a control signal based on the environmental lighting condition, and communicate the control signal to the timing circuit. The control signal can cause the timing circuit to one of generate additional off periods to reduce power associated with the load voltage, the reduced power causing the plurality of LEDs to dim, generate longer off periods to reduce power associated with the load voltage, the reduced power causing the plurality of LEDs to dim, remove off periods to increase power associated with the load voltage, the increased power causing the plurality of LEDs to get brighter, and/or generate shorter off periods to increase power associated with the load voltage, the increased power causing the plurality of LEDs to get brighter.

For example, the driver system can further include a control signal generation circuit configured to receive a signal indicating a thermal overload condition and communicate a control signal to the timing circuit. The control signal can cause the timing circuit to at least one of generate additional off periods to reduce power, and/or generate longer off periods to reduce power. The driver system can further include a direct current (DC) lighting circuit configured to switch the load voltage between the line voltage and a DC line voltage. The configuration switching circuit can be further configured to dynamically reconfigure the configuration for the plurality of LEDs to reduce a quantity of enabled LEDs to a minimum quantity of LEDs for safe visibility.

In another general aspect a system for controlling a load including a plurality of LEDs includes a drive circuit and a configuration switching circuit. The drive circuit is configured to generate a load voltage by rectifying a line voltage. The configuration switching is circuit configured to determine a voltage profile of the line voltage based on a voltage level of the line voltage and a frequency of the line voltage, select a configuration for the plurality of LEDs based on the voltage level, the configuration including at least one of a first quantity of LEDs in electrically coupled in series and a second quantity of LEDs electrically coupled in parallel, communicate the configuration for the plurality of LEDs to the load, dynamically reconfigure the configuration for the plurality of LEDs based on the voltage profile, and communicate the reconfigured configuration for the plurality of LEDs to the load during at least one cycle of the rectified line voltage. The dynamic reconfiguration of the configuration includes at least one of enabling or disabling one or more of the plurality of LEDs, changing at least one of the first quantity of LEDs in electrically coupled in series and the second quantity of LEDs electrically coupled in parallel.

Implementations can include one or more of the following features. For example, the driver system can further include a direct current (DC) source electrically coupled to the load voltage, wherein the DC source is configured to prevent flicker by maintaining the load voltage above a turn-on voltage of the plurality of LEDs. The driver system can further include a direct current (DC) source electrically coupled to the load voltage and an AC-DC converter configured to charge the DC source using the load voltage during a reconfiguration of the plurality of LEDs. The driver system can further include a sensor circuit configured to detect a voltage level associated with at least one of the line voltage and the rectified line voltage and communicate the detected voltage level to the encoder. The encoder can dynamically regenerate the time-off switching points and the time-on switching points based on the detected voltage level.

For example, the driver system can further include a sensor circuit configured to detect a voltage level associated with at least one of the line voltage and the rectified line voltage and communicate the detected voltage level to the configuration switching circuit. The configuration switching circuit can dynamically reconfigure the configuration for the plurality of LEDs based on the detected voltage level. The driver system can further include a look-up table and a sensor circuit configured to detect a voltage level associated with at least one of the line voltage and the rectified line voltage and communicate the detected voltage level to the configuration switching circuit. The configuration switching circuit can store the detected voltage level in the look-up table. The driver system can further include a look-up table stored a plurality of voltage levels associated with at least one of the line voltage and the rectified line voltage. The configuration switching circuit can dynamically reconfigure the configuration for the plurality of LEDs based on the stored plurality of voltage levels.

In yet another general aspect a modular light emitting diode (LED) fixture includes a light assembly and a heat sink. The light assembly includes a plurality of light emitting diodes (LED) and a driver system for controlling the plurality of LEDs, the driver system and the plurality of LEDs are physically coupled to a circuit board. The heat sink is physically coupled to the light assembly, the heat sink includes an access plate and at least one conduit fitting, the access plate is configured to provide access to a chamber where electrical connections can be made to the circuit board. A size of the chamber is smaller than a power supply module capable of powering the light assembly. The modular LED fixture does not include the power supply module capable of powering the light assembly. The heat sink further includes a receptacle used to physically couple two or more modular LED fixtures using a locking mechanism configured to implement a friction coupling between the two or more modular LED fixtures.

One or more alternative modular LED fixture and/or additions to the modular LED fixture can include a heat sink element, at least one LED physically coupled to the heat sink, and a controller communicatively coupled to the at least one LED and physically coupled to the heat sink, wherein the modular LED light fixture does not include a power supply. One or more alternative modular LED fixture and/or additions to the modular LED fixture can include a heat sink element, at least one LED physically coupled to the heat sink, a controller communicatively coupled to the at least one LED and physically coupled to the heat sink, wherein the modular LED light fixture does not include a power supply, and an adapter configured to allow a retrofit of the modular LED light fixture in a previously installed light fixture.

One or more alternative modular LED fixture and/or additions to the modular LED fixture can include a plurality of LED modules, each LED module including a substantially thermally isolated heat sink, each LED module including at least one LED physically coupled to the heat sink, and each LED module including a controller communicatively coupled to the at least one LED, and physically coupled to the heat sink, each heat sink including a friction coupling element configured to physically couple a first LED module of the plurality of LED modules with a second LED module of the plurality of LED modules, and each heat sink electrically coupled and configured to provide an common ground for the plurality of LED modules, the LED light fixture does not include a power supply, and each LED module is field replaceable within the LED light fixture.

One or more alternative modular LED fixture and/or additions to the modular LED fixture can include a plurality of LED modules, each LED module including a substantially thermally isolated heat sink, each LED module including at least one LED physically coupled to the heat sink, and each LED module including a controller communicatively coupled to the at least one LED, and physically coupled to the heat sink, each heat sink including a friction coupling element configured to physically couple a first LED module of the plurality of LED modules with a second LED module of the plurality of LED modules, and each heat sink electrically coupled and configured to provide an electrical ground for the plurality of LED modules, the LED light fixture does not include a power supply, and the LED light fixture is configured to operate at least 15 watts.

One or more alternative modular LED fixture and/or additions to the modular LED fixture can include a plurality of LED modules, each LED module including a substantially thermally isolated heat sink, each LED module including at least one LED physically coupled to the heat sink, and each LED module including a controller communicatively coupled to the at least one LED, and physically coupled to the heat sink, each heat sink including a friction coupling element configured to physically couple a first LED module of the plurality of LED modules with a second LED module of the plurality of LED modules, and each heat sink electrically coupled and configured to provide an electrical ground for the plurality of LED modules, the LED light fixture does not include a power supply, and the LED light fixture includes a DC storage device configured to reduce flicker.

One or more alternative modular LED fixture and/or additions to the modular LED fixture can include a plurality of LED modules, each LED module including a substantially thermally isolated heat sink, each LED module including at least one LED physically coupled to the heat sink, and each LED module including a controller communicatively coupled to the at least one LED, and physically coupled to the heat sink, each heat sink including a friction coupling element configured to physically couple a first LED module of the plurality of LED modules with a second LED module of the plurality of LED modules, and each heat sink electrically coupled and configured to provide an electrical ground for the plurality of LED modules, the LED light fixture does not include a power supply, and the at least one LED of each LED module can be individually controlled from a single source.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 13A, 13B and 13C show an example of a light system and a light fixture according to at least one example embodiment.

Figure 1:
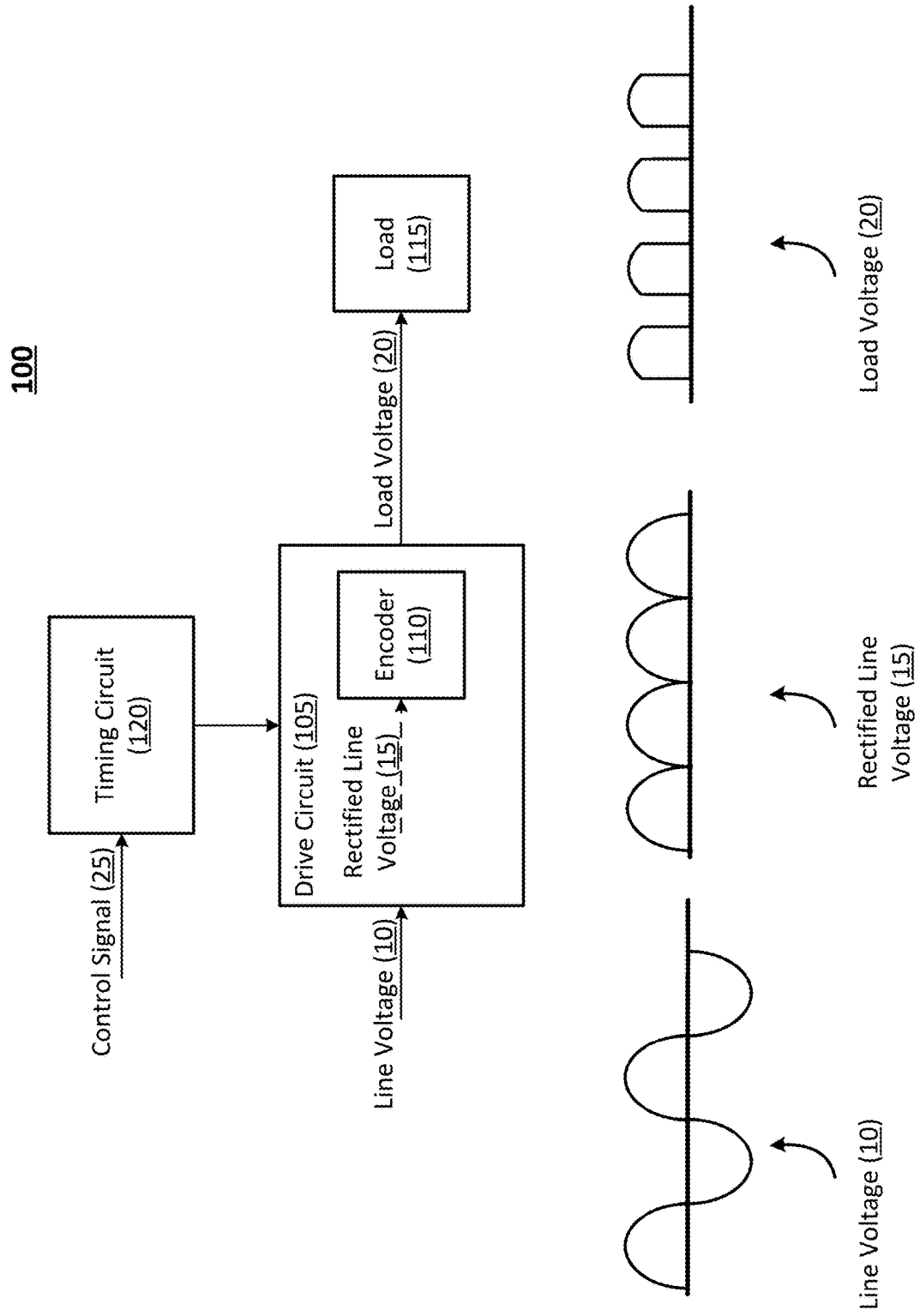
FIG. 1 illustrates a block diagram illustrating a portion of a driver system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Variable selection of LEDs (e.g., individual LEDs, strings of LEDs, groups of LEDs and/or the like) can be used to enable a LED fixture to be used in a plurality of operating environments. For example, variable selection of LEDs can allow a fixture to be used in any North America (e.g., 120 VAC, 220 VAC and 277 VAC) installation. Other installations (e.g., Europe) may also use the same fixture (e.g., the same manufacturing item number). As another example, variable selection of LED strings can more efficiently use available power based on normal variance in power line characteristics.

FIG. 1 illustrates a block diagram illustrating a portion of a driver system according to at least one example embodiment. As shown in FIG. 1 the portion of the driver system 100 includes a drive circuit 105, an encoder 110, a load 115 and a timing circuit 120. The drive circuit 105 can be configured to receive a line voltage 10 and generate a load voltage 20 used to drive the load 115. For example, the expected line voltage 10 (e.g., in North America, Europe and Asia) can be a 120 VAC, 220 VAC or 277 VAC voltage at 50 z or 60 Hz (and thus is illustrated as a sine wave. However, the line voltage can range from 106 VAC to 304 VAC based on line conditions (e.g., load). The load voltage 20 can be a time filtered rectified modification of the line voltage 10. Although not shown, the drive circuit can include a rectifier (e.g., a full-wave rectifier) that generates a rectified line voltage 15.

The encoder 110 can be configured to encode (e.g., time-wise filter) the rectified line voltage 15. For example, the timing circuit 120 can be configured to generate a time-off and/or a time-on switching points. For example, timing circuit 120 can generate a switching signal that is communicated to the encoder 110. Each time the switching signal is received, the encoder can switch a state (e.g., from on (conduct) to off (not conduct) or from off (not conduct) to on (conduct)) causing a voltage value of the rectified line voltage 15 to be output as the load voltage 20 when on and a minimum (e.g., zero) volts to be output as the load voltage 20 when off. In an example implementation, the off state can be centered at a minimum (e.g., zero) voltage of the rectified line voltage 15.

The timing circuit 120 can be configured to generate the time-off and/or the time-on switching points based on a control signal 25. The control signal 25 can be, for example, a voltage value. The voltage value can vary based on, for example, a desired amount of dimming when the load 115 is, for example, a string or mesh of LED lights. In an example implementation, a high value (e.g., 5 v) for the control signal 25 can cause the encoder 110 to switch to the on state and remain on for the entire cycle of the rectified line voltage 15. Further, a low value (e.g., 0 v) for the control signal 25 can cause the encoder 110 to switch to the off state and remain off for the entire cycle of the rectified line voltage 15. Still further, a mid (or other) value (e.g., 2.5 v) for the control signal 25 can cause the encoder 110 to periodically switch between the off state and the on state during the cycle of the rectified line voltage 15.

In an example implementation, the control signal 25 can be based on a voltage difference (e.g., as compared to the line voltage 10). For example a low value (e.g., 0 v) for the control signal 25 can cause the encoder 110 to switch to the on state and remain on for the entire cycle of the rectified line voltage 15. Further, a high value (e.g., a value equal to peak or average line voltage) for the control signal 25 can cause the encoder 110 to switch to the off state and remain off for the entire cycle of the rectified line voltage 15. Still further, a mid (or other) value (e.g., a value between 0 and the peak or average line voltage 10) for the control signal 25 can cause the encoder 110 to periodically switch between the off state and the on state during the cycle of the rectified line voltage 15.

In addition to modulating the power to adapt to high or low line voltage, the LED mesh can be varied as well. For example, additional LEDs can be added in series in response to high voltages and additional LEDs can be added in parallel to in response to lower voltages. In one implementation, a LED mesh can be configured to include an LED count sized for the maximum voltage and have the ability to take unneeded LEDs off-line. Alternatively (or in addition to), a LED mesh can be configured to include an LED count sized for the minimum voltage and have the ability to add LEDs.

Accordingly, the timing circuit 120 can be configured to determine characteristics of the rectified line voltage 15 and/or the line voltage 10. For example, the timing circuit 120 can be configured to determine a time period associated with a full cycle, a half cycle and the like based on the frequency of the rectified line voltage 15 and/or the line voltage 10. For example, the timing circuit 120 can be configured to determine a peak voltage (AC and/or DC), a common-mode voltage, an average voltage, a root mean square (RMS) voltage and the like based on the frequency of the rectified line voltage 15 and/or the line voltage 10.

In an example implementation, the timing circuit 120 can include a look-up table, a file, a database and/or the like used to determine the switching time and/or times based on the control signal 25. In an example implementation, the drive circuit 105 and the timing circuit are on a single circuit board. In an example implementation, the drive circuit 105 and the timing circuit are implemented in an application specific integrated circuit (ASIC). In an example implementation, the drive circuit 105 and the timing circuit are implemented in a same (e.g., one) ASIC.

Figure 2:
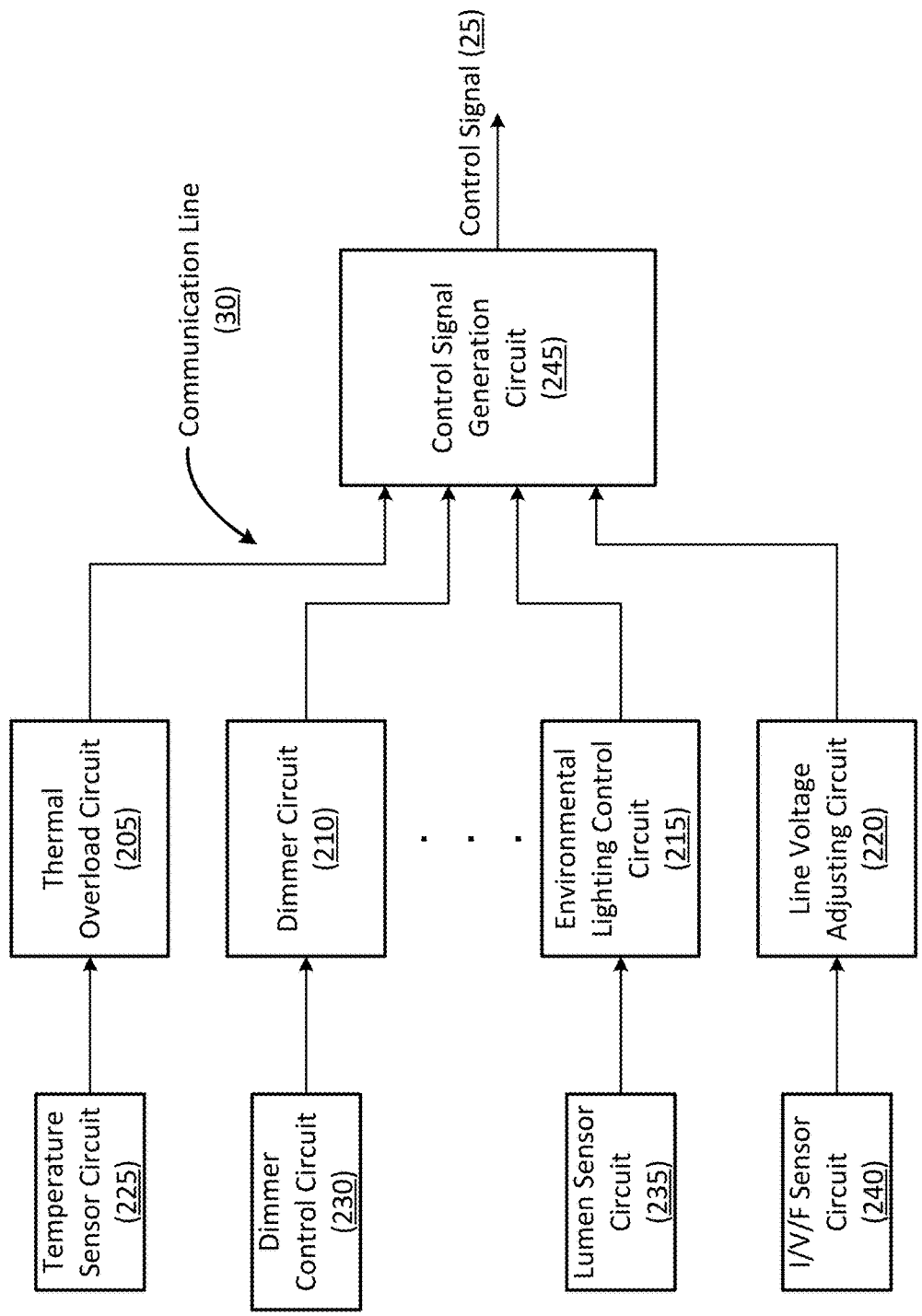
FIG. 2 illustrates a block diagram illustrating a control system according to at least one example embodiment.

FIG. 2 illustrates a block diagram illustrating a control system according to at least one example embodiment. As shown in FIG. 2 the portion of the driver system includes a thermal overload circuit 205, a dimmer circuit 210, an environmental lighting control circuit 215, a line voltage adjusting circuit 220, a temperature sensor circuit 225, a dimmer control circuit 230, a lumen sensor circuit 235, an I/V/F sensor circuit 240 and a control signal generation circuit 245.

The control signal generation circuit 245 can be configured to generate the control signal 25 based on at least one of a temperature, a dimmer setting, an environmental lighting characteristic, an power source line characteristic and the like. In some implementations, the control signal 25 can be generated directly by a sensor (e.g., temperature sensor) and/or circuit that is directly coupled to the sensor. Therefore, the control signal generation circuit 245 may not be included or may be bypassed. For example, control system may include only the dimmer circuit 210 or a thermal overload circuit 205. In some implementations, the control signal generation circuit 245 (or its functions) may be included in the timing circuit 120.

The temperature sensor circuit 225 can be configured to detect a temperature. The temperature can be an environmental temperature, circuit board temperature, an ASIC temperature, a fixture (e.g., lighting fixture) temperature and the like. The temperature sensor circuit 225 can be a plurality of sensors located based on a desired design. The thermal overload circuit 205 can be configured to determine whether or not a thermal overload condition exists based on a signal received from the temperature sensor circuit 225. The signal can be a data packet (e.g., communicated via wire or wirelessly), a digital signal, a voltage level and the like. If a thermal overload condition exists, control signal 25 can be generated such that the timing circuit 120 causes more off periods and/or longer off periods during a cycle. This reduces power to the load 115 and should reduce the sensed temperature. For example, if the load 115 is a LED string or mesh, the reduced power can cause the LED string or mesh to dim causing a reduced temperature at a light fixture, a circuit board, an ASIC and the like associated with the LED string or mesh.

The dimmer control circuit 230 can be configured to be operated by a user in order to generate a signal (e.g., a voltage level) configured to change (e.g., reduce or increase) an output of a light. The signal can be received by the dimmer circuit 210 which can then communicate the signal (or a modified signal) to the control signal generation circuit. In a simplified implementation, the dimmer control circuit 230 can be configured to directly generate the control signal 25. As the signal output from the dimmer control circuit 230 is varied, control signal 25 can be generated such that the timing circuit 120 causes more off periods and/or longer off periods (to reduce power) or less off periods and/or shorter off periods (to increase power from a reduced power state) during a cycle. This varies power to the load 115. For example, if the load 115 is a LED string or mesh, the varied power can cause the LED string or mesh to variably dim (reduce/increase light intensity).

The lumen sensor circuit 235 can be configured to sense an environmental lighting condition. In an example implementation, two or more lumen sensor circuits 235 can be placed in a space. For example, a first lumen sensor circuit 235 could be placed near a window and a second lumen sensor circuit 235 could be placed away from the window. As light increases or decreases in the vicinity of the window, a light near the window could be variably dimmed (increased or decreased) to match an environmental light in the vicinity of the second lumen sensor circuit 235. In another example an environment could have multiple levels (e.g., a stairway) with light fixtures having different heights relative to the environment that the lights are illuminating. Two or more lumen sensor circuits 235 can be used to detect environmental light such that a dimming of each of the lights can be varied to cause environmental light to be generally consistent where it will be perceived (e.g., at or about eye level) across the multiple levels. The environmental lighting control circuit 215 can be configured to control power delivered to each LED light string or mesh (e.g., as the load 115) using the control signal 25.

The I/V/F sensor circuit 240 can be configured to detect line current, line voltage and/or line frequency. As discussed above, power to the load 115 can be varied based on controlling how often or how long the drive circuit 105 applies power to the load 115 during a cycle. This is based on power being equal to I×V. However, voltage (V) can vary based on system specification. For example, 120V line voltage can vary between 100V and 127V. Therefore the power delivered to the load 115 can vary based on the line voltage. In an example implementation, line voltage is monitored by the I/V/F sensor circuit 240 and communicated to the line voltage adjusting circuit 220. The line voltage adjusting circuit 220 can determine a variance from a threshold value (e.g., 120V) and at least one of generate the control signal 25 and/or communicate an indication of the variance to the control signal generation circuit 245. The control signal 25 can cause the drive circuit 105 to vary the timing of the on/off periods of the cycle of the load voltage 20.

Communication line 30 can be wired or wireless. For example, some of the circuits can be on one circuit board. Therefore, communication line 30 could be a conduction path or trace on the circuit board. For example, some of the circuits can be dispersed on a fixture and/or a plurality of fixtures. Therefore, the communication line 30 could be a cable communicatively coupling the circuits and/or circuits in the plurality of fixtures. For example, some of the circuits can be dispersed in space on a fixture and/or a plurality of fixtures. The cable could be a power cable and the communication could use a (custom or standard) wireline communication protocol. For example, some of the circuits can be dispersed in space on a fixture and/or a plurality of fixtures. Therefore, the communication line 30 could be a wireless communication channel. The communication could use a (custom or standard) wireless communication protocol.

Figure 3:
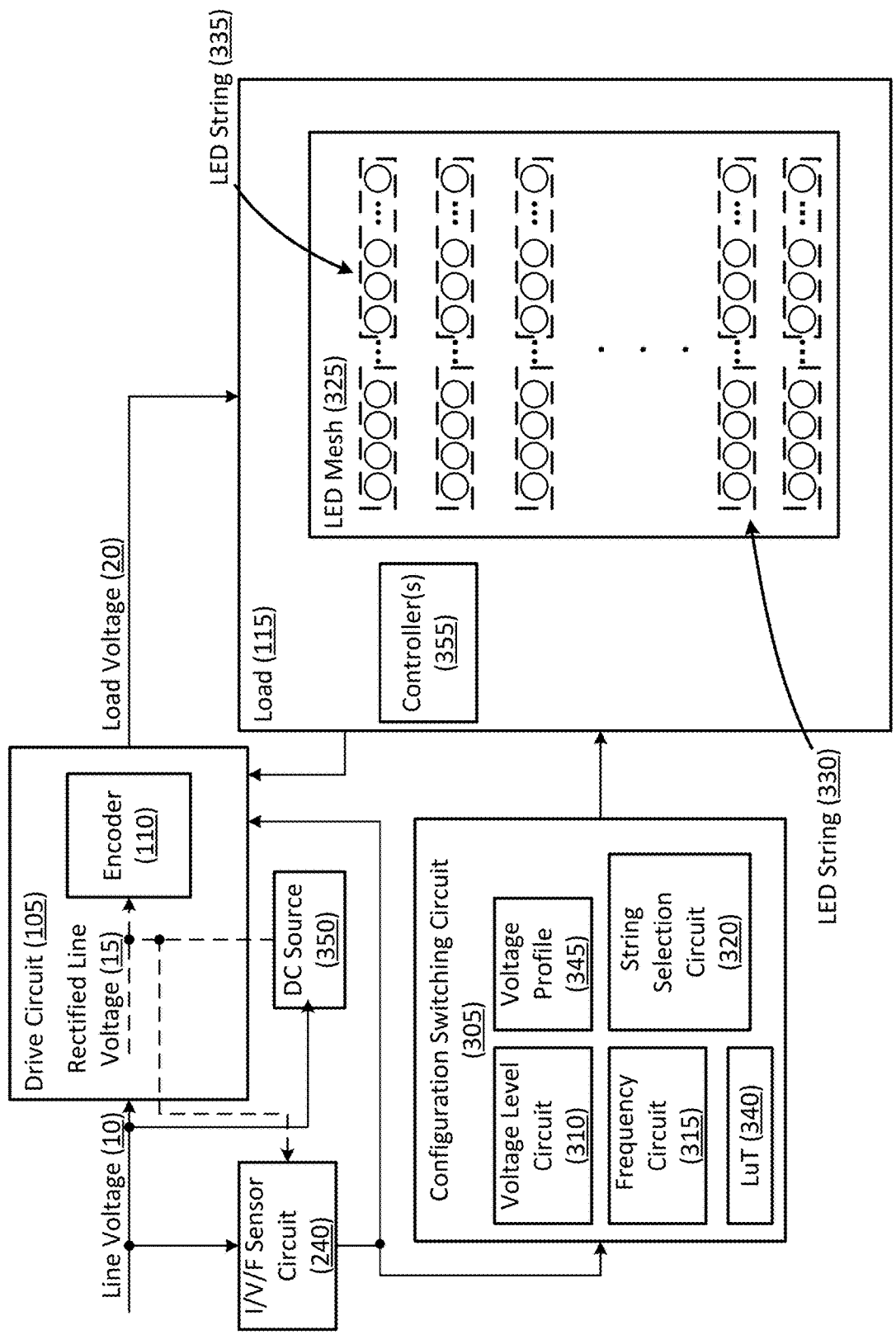
FIG. 3 illustrates another block diagram illustrating a portion of the driver system according to at least one example embodiment.

FIG. 3 illustrates another block diagram illustrating a portion of the driver system 100 according to at least one example embodiment. As shown in FIG. 3 the portion of the driver system includes the drive circuit 105 and the I/V/F sensor circuit 240. The portion of the driver system 100 further includes a configuration switching circuit 305. The configuration switching circuit 305 includes a voltage level circuit 310, a frequency circuit 315, a string selection circuit 320, a voltage profile 345, and a look-up table 340. The string selection circuit 320 can be configured to select strings of lights in the LED mesh 325. For example, LED string 330 may be selected as a group and LED string 335 may be individually selected (e.g., by individual LED). For example, 120V line voltage can vary between 100V and 127V. Therefore, in an example implementation, a number of LED strings 330 could be selected, by the string selection circuit 320, as a group based on the minimum voltage of 100V. Then a number of individual LEDs could be selected from LED string 335 up to 127V. For example, first number of LED's could be selected from LED string 335 if the voltage level circuit determines that the voltage is 120V and a second number of LED's could be selected from LED string 335 if the voltage level circuit determines that the voltage is 123V. Similarly, the string selection circuit 320 could make a selection based of frequency (e.g., 50 Hz+/− or 60 Hz+/−). Variable selection of LED strings can more efficiently use the available power based on normal variance in power line characteristics.

Before a LED can emit light it needs a current to flow through the LED. In other words, a LED is a current dependent device with its light output intensity being directly proportional to the forward current flowing through the LED. Because LED's are current-dependent devices a forward voltage drop $V_F$ or turn-on voltage is applied before light can emit from the LED. The turn-on voltage can depend on the semiconductor compound (e.g., light color) and on the forward biased LED current. Most common LED's require a forward operating voltage of between approximately 1.2 to 3.6 volts.

Accordingly, a LED has a step like behavior (on-off-on-off . . . ) when operated using an AC voltage. However, example implementations can more closely match a smooth power curve using the aforementioned line voltage 15. Further, the number of LED's can be based on the forward operating or turn-on voltage. Continuing the example above, if the turn-on voltage is 1.5V and the minimum voltage is 100V, 67 LEDs (≈100/1.5) can be included in a base LED string or mesh (e.g., LED string 330). Then an LED can be added for each 1.5V above 100V. This implementation can also more closely match a smooth power curve. Further, the ability to stack more LEDs together in response to higher voltages can reduce the stress on each of the individual LEDs and provide improved performance and reliability.

As discussed above, the number of LED's can be based on the forward operating or turn-on voltage. In other words, a system turn-on voltage can be based on a number of or a string of LED's coupled in series. Two or more of the string of LED's coupled in series can then be connected or stacked in parallel to draw more or less power at the system turn-on voltage. The system can be a LED mesh including a plurality of fixed position LEDs. The LEDs can have an associated switch (e.g., a MOSFET, BJT and/or the like) configured to turn-on/turn-off (enable/disable) a LED, a string of LEDs, a group of LED's and the like. In an example configuration, the LED's can be configured to be all on for a maximum input voltage. The input voltage can be variable (e.g., 120 VAC, 240 VAC, 100 VDC, and/or the like). Therefore, the LED's can be reconfigured (e.g., vary series and parallel connections) for different voltage systems. Further, the LED's can be dynamically reconfigured (e.g., dynamically vary series and parallel connections) as voltage varies (e.g., AC input and/or as input voltage varies within a system range). For example, if the turn-on voltage is 1.5V and the minimum voltage is 100V, 67 LEDs (≈100/1.5) can be included in a base LED string or mesh (e.g., LED string 330 and/or LED mesh 325). Then an LED can be added for each 1.5V above 100V. This implementation can also more closely match a smooth power curve. Further, the ability to enable more LEDs together, in series, in response to higher voltages can reduce the stress on each of the individual LEDs and provide improved performance and reliability.

The switching of the state from on to off can cause light flicker. Light flicker can cause an undesirable lighting condition (e.g., in inside lighting). Therefore, in an example implementation, the portion of the driver system 100 can include a DC source 350. In this example implementation, the DC source 350 can be configured to prevent the rectified line voltage 15 (and thus the load voltage 20) from reaching a zero voltage during a cycle. Accordingly, the DC source 350 can prevent and/or reduce light flicker. In example implementations, the DC source 350 can be a battery, a capacitor, an inductor, a semiconductor, a magnet, and/or the like. In example implementations, the DC source 350 can be charged/re-charged using the line voltage 10. Although the DC source 350 is illustrated as being coupled to the rectified line voltage 15, in one or more implementations, the DC source 350 can be coupled to the line voltage 10.

The I/V/F sensor circuit 240 can be configured to determine, detect and/or sense line and/or rectified current, voltage and/or frequency. Further, the I/V/F sensor circuit 240 can be configured to determine, detect and/or sense characteristics of the rectified line voltage 15 and/or the line voltage 10. For example, the I/V/F sensor circuit 240 can be configured to determine, detect and/or sense a time period associated with a full cycle, a half cycle and the like based on the frequency of the rectified line voltage 15 and/or the line voltage 10. For example, the I/V/F sensor circuit 240 can be configured to determine, detect and/or sense a peak voltage (AC and/or DC), a common-mode voltage, an average voltage, a root mean square (RMS) voltage and the like based on the voltage and/or the frequency of the rectified line voltage 15 and/or the line voltage 10. In addition, the I/V/F sensor circuit 240 can be configured to determine, detect and/or sense the DC source 350 output voltage. For example, the I/V/F sensor circuit 240 can be configured to determine, detect and/or sense the DC source 350 output voltage based on the rectified line voltage 15. In an example implementation, the DC source 350 output voltage may be (or approximate) the minimum rectified line voltage 15.

In an example implementation, the rectified line voltage 15 being greater than or equal to a threshold voltage value (e.g., 5 v) can cause the encoder 110 to switch to the on state and remain on for a first portion of the cycle of the rectified line voltage 15. Further, the rectified line voltage 15 being less than the threshold voltage value can cause the encoder 110 to switch to the off state and remain off for a second portion of the cycle of the rectified line voltage 15 and/or until the rectified line voltage 15 is greater than or equal to the threshold voltage value. The threshold voltage value can be based on a sum of the forward operating or turn-on voltages associated with a minimum number of LED's enabled in the LED mesh 325. Adding the DC source 350 voltage to the rectified line voltage 15 can cause the resultant rectified line voltage 15 to remain above the threshold voltage value. Therefore, the encoder 110 may switch to the on state and remain on for the entire cycle of the rectified line voltage 15.

In an example implementation, a configuration of the LED mesh 325 (e.g., a number of LEDs enabled, a number of LEDs in series, a number of LEDs in parallel, and/or the like) can be dynamically varied. For example, additional LEDs can be added in series in response to high voltages and additional LEDs can be added in parallel to in response to lower voltages. As discussed above, LED's can have an associated switch (or switches) to enable/turn-on or disable/turn-off the LED. Accordingly, adding LEDs in series or parallel can include repositioning the switch (or switches) to enable/turn-on the associated LED or LEDs. Further, subtracting LEDs can include repositioning the switch (or switches) to disable/turn-off the associated LED or LEDs.

In an example implementation, the drive circuit 105, the I/V/F sensor circuit 240, and/or the configuration switching circuit 305 can be elements of an ASIC, a microprocessor and/or the like. Further, the coupling to the load 115 can be a two (2) wire interconnect (e.g., a two wire cable, a two pin connector, and/or the like. Still further, the LED mesh 325 can operate in a DC-mode and an AC-mode and the controller(s) 355 can be configured to implement the DC-mode and the AC-mode and/or a combination of the DC-mode and the AC-mode. The controller(s) 355 (like the combined elements) can be implemented as an ASIC, a microprocessor and/or the like. Further, the controller(s) 355 can be implemented as two or more controllers. For example, the DC-mode can be implemented in a first controller and the AC-mode can be implemented in a second controller. Each of the two or more controllers can be addressed individually and coupled to the two (2) wire interconnect.

For example, the AC-mode can be configured to incrementally turn-on or turn-off individual LEDs and/or strings of LEDs in series based on an AC-voltage and in parallel based on a power setting. The AC-mode can include at least one pre-defined configuration. The pre-defined configuration can be selected by the configuration switching circuit 305. For example, a pre-defined configuration can be stored in controller(s) 355. The pre-defined configuration can be defined by a minimum voltage, a maximum voltage, a frequency, and a voltage step size. The minimum voltage can be a voltage based on the DC source and/or the turn-on voltage of each LED. Further, the minimum voltage can be a voltage based on a stack of LED's configured in series (e.g., a minimum number of LEDs connected in series). The frequency can be based on the frequency of the line voltage 10 and/or the rectified voltage 15. The voltage step size can be based on the turn-on voltage of each LED (or a number of LEDs).

For example, the turn-on voltage of each LED in LED mesh 325 can be 3V, the DC source 350 can be 3V, the maximum of the line voltage 10 can be 120V, and the frequency of the line voltage 10 can be 60 Hz. In this case, the controller(s) 355 can include an AC-mode (e.g., AC-mode_1) that has a minimum voltage of 3V, a voltage step size of 3V and an increment time based on 120V and 60 Hz. Then, if the I/V/F sensor circuit 240 detects a 60 Hz voltage source with a peak voltage of 120V and the driver system 100 is configured with a DC source 350 rated at 3V, the configuration switching circuit 305 can communicate a selection of an AC-mode (e.g., AC-mode_1) based on the I/V/F sensor circuit 240 detection to the controller(s) 355.

In response to receiving the selection of the AC-mode, the controller(s) 355 can be configured to implement the AC-mode. Continuing the example above and beginning at a load voltage of 3V, the controller(s) 355 incrementally enables or disables an LED in parallel every x seconds where x is based on a 120V and 60 Hz source. Where x can be calculated using a trigonometric function (e.g., $\sin^{-1}$) based on a 120V and 60 Hz. However, in example implementations, a sensed voltage can trigger the enabling/disabling of an LED. As the I/V/F sensor circuit 240 detects a change in voltage and/or frequency of the source, the configuration switching circuit 305 can select and communicate a change in the AC-mode. Accordingly, the LED mesh 325 voltage can track line voltage 10 and thus operate more efficiently, improve Power Factor, improve Total Harmonic Distortion (THDi), and/or the like.

Further, each LED in LED mesh 325 can have a rated current. For example, depending on manufacturing specifications, a LED current can range from 100 mA to 300 mA and above. Therefore, a power drawn by the LED mesh 325 can be varied based on a number of LED's in the LED mesh 325. Based on the above example, each LED has a turn on voltage of 3V. Therefore, as an LED is enabled or disabled, the power drawn by the LED mesh 325 increases or decreases by the rated current of the LED multiplied by 3V. If a brighter light is desired, more LED's can be added in parallel which keeps voltage constant. Alternatively, more LED's can be added in series which increases voltage (e.g., in 3V increments). Therefore, the controller(s) 355 can vary the power drawn by the LED mesh 325 (and therefore the load 115) by enabling and disabling LED's during the AC cycle in the AC-mode. In other words, the controller(s) 355 can the AC-mode can have a constant or variable power setting which can be implemented by the controller(s) 355 based on enabling and disabling LED's during the AC cycle.

The LED mesh 325 can operate in a DC-mode. For example, as the line voltage 10 and/or the rectified line voltage 15 (and thus the load voltage 20) decreases to the zero (0) volt crossing (e.g., as detected by the I/V/F sensor circuit 240) during the AC cycle, the string selection circuit 320 can communicate a selection of a DC-mode (e.g., DC-mode_1) to the controller(s) 355. In response to receiving the selection of the DC-mode, the controller(s) 355 can be configured to implement the DC-mode. The string selection circuit 320 can be configured to trigger switching to the DC-mode at a threshold value. For example, the string selection circuit 320 can be configured to trigger switching to the DC-mode at the turn-on voltage of each LED (or a minimum number of LEDs). Switching to the DC-mode, by the controller(s) 355, can include selecting (e.g., enabling or turning on) a number of LEDs or strings of LEDs to operate (e.g., be powered by) the DC source 350 (e.g., when load voltage 20 is clipped at a minimum voltage equal to the voltage supplied by the DC source 350).

Continuing the example above, the turn-on voltage of each LED can be 3V. Therefore, the controller(s) 355 should switch from the AC-mode to the DC-mode at (or before) 3V (plus some margin to help prevent flicker). Accordingly, the threshold value for switching from the AC-mode to the DC-mode can be slightly above (e.g., 1 mV, 10 mV, 50 mV, or the like) 3V to allow a margin for preventing flicker and for communicating a triggering of the switching. Therefore, the string selection circuit 320 can be configured to communicate the selection of the DC-mode (e.g., DC-mode_1) to the controller(s) 355 when the I/V/F sensor circuit 240 detects voltage decreasing to, for example, 3.05V during the fall of the AC cycle.

In addition, as the line voltage 10 and/or the rectified line voltage 15 (and thus the load voltage 20) increases above the zero (0) volt crossing (e.g., as detected by the I/V/F sensor circuit 240) during the AC cycle, the string selection circuit 320 can communicate a selection of the AC-mode (e.g., AC-mode_1) to the controller(s) 355. In response to receiving the selection of the AC-mode, the controller(s) 355 can be configured to implement the AC-mode as described above. The string selection circuit 320 can be configured to trigger switching from the DC-mode to the AC-mode at a threshold value. For example, the string selection circuit 320 can be configured to trigger switching from the DC-mode to the AC-mode at the turn-on voltage of each LED (or a minimum number of LEDs).

Continuing the example above, the turn-on voltage of each LED can be 3V. Therefore, the controller(s) 355 should switch from the DC-Mode to the AC-mode at 3V (plus some margin to help prevent flicker). Accordingly, the threshold value for the switch back to the AC-mode can be slightly below (e.g., 1 mV, 10 mV, 50 mV, or the like) 3V to allow for communicating a triggering of the switching plus some margin to help prevent flicker. Therefore, the string selection circuit 320 can be configured to communicate the selection of the AC-mode (e.g., AC-mode_1) to the controller(s) 355 when the I/V/F sensor circuit 240 detects voltage increasing to, for example, 3V during the rise of the AC cycle.

The DC-mode (e.g., DC-mode_2) can also cause the controller(s) 355 to configure the LED mesh 325 to track the AC cycle. Tracking the AC cycle can include tracking voltage, current and/or power of the LED mesh 325 (and the load 115). For example, as discussed above, the DC source 350 voltage can be based on the turn-on voltage (e.g., 3V) of each LED. Therefore, in order to operate at the DC source 350 voltage and track power, a number of LED's and/or LED strings can be added in parallel in the LED mesh 325 based on the current rating of the LED's. Tracking power can cause the LED mesh 325 luminance (or brightness) to be (approximately or substantially) the same (e.g., vary less than is recognizable by the human eye) in the AC-mode and the DC-mode.

The LED mesh 325 can operate in both an AC-mode and a DC-mode. For example, as the line voltage 10 and/or the rectified line voltage 15 (and thus the load voltage 20) varies through the AC cycle, the controller(s) 355 can reconfigure LEDs in the LED mesh 325 to cause the voltage of the LED mesh 325 to (approximately or substantially) match the load voltage 20. Reconfiguring LEDs in the LED mesh 325 can include switching a parallel/series configuration of LED's and/or LED strings, enabling LED's and/or LED strings, and/or disabling LED's and/or LED strings. In order to reconfigure LEDs in the LED mesh 325, the turn-on voltage is removed from the LED's and/or LED strings, the LED's and/or LED strings are configured based on the load voltage 20 and the turn-on voltage is applied. The controller(s) 355 can be configured as a high frequency switch. Therefore, the switching or reconfiguring of the LEDs in the LED mesh 325 can be completed in fractions of a second. Accordingly, no flicker should be detected.

However, in the combined AC-mode and DC-mode implementation, the controller(s) 355 can cause the LED mesh 325 to operate in the DC-mode while the turn-on voltage is removed from the LED's and/or LED strings during the reconfiguration of the LED's of the LED mesh 325 for the AC-mode. For example, removing the turn-on voltage by the controller(s) 355 can include causing the encoder 110 to filter the rectified line voltage 15 and pass the DC source 350. Thus the load voltage 20 is substantially equal to the voltage of the DC source 350. At substantially the same moment in time, the controller(s) 355 can switch the LED mesh 325 to the DC-mode. Then the controller(s) 355 can reconfigure the LED's and/or LED strings. Finally, the controller(s) 355 can cause the encoder 110 to pass the rectified line voltage 15 and the DC source 350. This describes one example technique, other techniques of implementing the combined AC-mode and DC-mode are within the scope of this disclosure. For example, the controller(s) 355 can cause the removal of the turn-on voltage via communications with the LED mesh 325 without using the encoder 110.

Implementing the DC-mode alone to prevent turning off of the LED mesh 325 during zero (0) volt crossing can prevent and/or reduce light flicker. Implementing the DC-mode in combination with the AC-mode can prevent and/or reduce light flicker during LED mesh 325 reconfigurations. In some implementations the DC-mode can be limited by a current capacity of the DC source 350. For example, selecting a number of LED's and/or LED strings with a combined current rating of the DC source 350 can cause damage to or reduce the life of the DC source 350. Therefore, the controller(s) 355 can include a feature to limit the number of LED's and/or LED strings that are powered based on the current rating of the LED's and the current rating of the DC source 350. However, should the DC source 350 be damaged and/or removed from the driver system 100, the driver system 100 can continue to operate in the AC-mode.

Further, the LED mesh 325 can be configured as a variable color mesh. Accordingly, the controller(s) 355 can be configured to color tune the LED mesh 325. Color tuning can include varying an illumination color. For example, the LED mesh 325 can be configured to illuminate white, blue, red, green, yellow, and/or the like light. Therefore, the controller(s) 355 can be configured to select between the available colors. Further, the LED mesh 325 can be configured to illuminate variations of the available colors. For example, the LED mesh 325 can be configured to illuminate soft white, warm white, bright white, and/or the like. Therefore, the controller(s) 355 can be configured to select between the variations of the available colors. The controller(s) 355 can select between these options based on a user input, a time of day, environmental conditions, and/or the like. The LED mesh 325 can include LEDs that can vary between a range of colors (e.g., based on a voltage) or can include individual color LED's that can be selected by the controller(s) 355 to cause the illumination of a selected color and/or color variation.

In another implementation, a LED mesh 325 can be configured to include an LED count sized for the maximum voltage and have the ability to take unneeded LEDs off-line. Alternatively (or in addition to), a LED mesh 325 can be configured to include an LED count sized for the minimum voltage and have the ability to add LEDs. Accordingly, the I/V/F sensor circuit 240 can cause the configuration switching circuit 305 to vary a configuration of the LED mesh 325. The string selection circuit 320 can be configured to select individual LEDs (e.g., one or more LED of LED string 335) and/or strings of LEDs (e.g., LED string 330) in the LED mesh 325 (sometimes referred to as LED Group On/Off control). The string selection circuit 320 can be configured to select individual LEDs and/or strings of LEDs in the LED mesh 325 based on a configured voltage and/or power. For example, individual LEDs and/or strings of LEDs can be configured in parallel to attain a current while maintaining a constant voltage and/or individual LEDs and/or strings of LEDs can be configured in series to attain a voltage while maintaining a constant current. Varying individual LEDs and/or strings of LEDs to attain a voltage and/or current can also attain a configured power. A variable configuration (e.g., varying both parallel and series connections of the LED's) can be used to attain a configured power.

For example, LED string 330 may be selected as a group and LEDs in the LED string 335 may be individually selected (e.g., by individual LED). For example, 120V line voltage can vary between 100V and 127V. Therefore, in an example implementation, a number of LED strings 330 could be selected, by the string selection circuit 320, as a group based on the minimum voltage of 100V. Then a number of individual LEDs could be selected from the LED string 335 up to 127V. For example, a first number of LED's could be selected from the LED string 335 if the voltage level circuit 310 determines that the voltage is 120V and a second number of LED's could be selected from the LED string 335 if the voltage level circuit determines that the voltage is 123V. Similarly, the string selection circuit 320 could make a selection based of frequency (e.g., 50 Hz+/− or 60 Hz+/−). Variable selection of LED strings and LEDs can more efficiently use the available power based on normal variance in power line characteristics. Further, the string selection circuit 320 can select a configuration of individual LEDs and/or strings of LEDs in series and/or parallel based on a voltage of the DC source 350 in order to prevent and/or reduce light flicker.

In an example implementation, the voltage level circuit 310 can detect (determine and/or calculate) a single voltage (e.g., peak voltage, a common-mode voltage, an average voltage, a root mean square (RMS) voltage and the like) associated with the line voltage 10 and/or the rectified line voltage 15. The single voltage can be communicated to the string selection circuit 320. The string selection circuit 320 can be configured to select individual LEDs and/or strings of lights in the LED mesh 325 based on the single voltage. The single voltage can be used as an AC voltage reference to trigger fixed-time-base LED Group On/Off control that does not accommodate line voltage variations (e.g., line voltage changes resulting from based grid conditions and/or local power utilization).

In an example implementation, the voltage level circuit 310 can detect (determine and/or calculate) a continuously sampled voltage (e.g., peak voltage, a common-mode voltage, an average voltage, a root mean square (RMS) voltage and the like) associated with the line voltage 10 and/or the rectified line voltage 15. The continuously sampled voltage can be communicated to the string selection circuit 320. The string selection circuit 320 can be configured to select individual LEDs and/or strings of LEDs (e.g., LED string 330) in the LED mesh 325 based on the continuously sampled voltage. The use of the continuously sampled line voltage 10 (e.g., AC line-voltage input) and/or the rectified line voltage 15 to determine LED Group On/Off control can accommodate for line voltage variations which can be an improvement over LED Group On/Off control that does not accommodate for line voltage variations. For example, improvements can include increased power efficiency, increased light output efficiency, decreased heat generation in the driver system and/or the load and lower thermal management costs and/or the like.

In an example implementation, a size (e.g., voltage capacity) of the DC source 350 can be based on a minimum number of LEDs (e.g., to obtain a desired or specified lighting effect) and the forward operating or turn-on voltage for the LEDs. For example, if the turn-on voltage of each LED is 1.5V and the minimum number of LEDs (e.g., as a base LED string or mesh) is 10, the DC source 350 voltage is 15V (≈10×1.5). Accordingly, if the minimum number of LEDs is one (1) LED, the DC source 350 voltage is 1.5V. Further, using the continuously sampled voltage technique described above, individual LEDs and/or strings of LEDs (e.g., LED string 330) in the LED mesh 325 can be enabled or disabled based on the continuously sampled voltage. Using the continuously sampled voltage technique described above together with the DC source 350 can prevent and/or reduce light flicker.

In this implementation, during a voltage cycle individual LEDs and/or strings of LEDs are added (e.g., stepwise added) beginning with the minimum number of LEDs (e.g., based on the DC source 350 voltage) up to a maximum number of LEDs (e.g., based on the peak voltage of the continuously sampled line voltage 10 and/or the rectified line voltage 15). Then individual LEDs and/or strings of LEDs are subtracted (e.g., stepwise subtracted) down to the minimum number of LEDs (e.g., based on the DC source 350 voltage). This addition/subtraction of LEDs continues for each half cycle of the continuously sampled line voltage 10 and/or cycle of the rectified line voltage 15.

In an example implementation, continuously sampled voltage (e.g., line voltage 10 and/or the rectified line voltage 15) can be periodically stored. In this implementation, the stored continuously sampled voltage can be used by the string selection circuit 320 to select individual LEDs and/or strings of lights in the LED mesh 325 instead of a live continuously sampled voltage. For example, the voltage profile 345 can be (or include) a computer memory. The continuously sampled voltage can be stored in the voltage profile 345 as a stored voltage profile. The continuously sampled voltage can be stored in the voltage profile 345 as a stored voltage profile. The voltage profile 345 can be configured to store at least one continuously sampled voltage captured over a period of time (e.g., a number of AC line cycles).

For example, the voltage profile 345 can include a first stored voltage profile as a stored continuously sampled voltage and a second stored voltage profile as a continuously sampled voltage in the process of being captured. The first stored voltage profile can be used by the string selection circuit 320 to select individual LEDs and/or strings of lights in the LED mesh 325. In response to ending the capturing of the second stored voltage profile (e.g., the number of AC line cycles for a profile have been captured), the string selection circuit 320 can trigger the use of the second stored voltage profile to select individual LEDs and/or strings of lights in the LED mesh 325 and the first stored voltage profile can be discarded. In other words, the voltage profile 345 can be (or include) a memory queue from which the string selection circuit 320 selects a stored voltage profile.

Using the stored voltage profile can improve the operation of the driver system. For example, using the stored voltage profile can be more stable base for determining control than using live samples, allow more effective and less costly filtering of AC line noise, reduce and/or eliminate flicker associated with AC line noise, and/or the like. Using the stored voltage profile technique described above together with the DC source 350 can prevent and/or reduce light flicker.

In an example implementation, a plurality of stored voltage profiles can be arithmetically averaged. In this implementation, the plurality of stored voltage profiles can be successive (or contiguous) continuously sampled voltages (e.g., line voltage 10 and/or the rectified line voltage 15). The voltage profile 345 and/or the string selection circuit 320 can be configured to calculate an arithmetically averaged voltage profile. In this implementation, the arithmetically averaged voltage profile can be used by the string selection circuit 320 to select individual LEDs and/or strings of lights in the LED mesh 325 instead of a single sampled voltage profile.

For example, prior to storing a voltage profile in the memory queue, the voltage profile 345 can arithmetically average a plurality of successive continuously sampled voltages (e.g., a predetermined number of contiguous AC line cycles) as the voltage profile to be stored. In response to ending the capturing of a voltage profile (e.g., the number of AC line cycles for a profile have been captured), the voltage profile 345 can trigger the arithmetically averaging. The voltage profile 345 can include a memory configured to store a predetermined number of previous (e.g., prior in time) contiguous AC line cycles for use in the arithmetically averaging. The arithmetically averaged contiguous AC line cycles can be stored as a stored voltage profile. Storing a voltage profile can trigger the voltage profile 345 to discard (e.g., remove from memory) a contiguous AC line cycle (e.g., an oldest cycle) so that only the predetermined number of previous contiguous AC line cycles is used in the arithmetic averaging.

For example, prior to using a voltage profile to select individual LEDs and/or strings of lights in the LED mesh 325, the string selection circuit 320 can arithmetically average a plurality of successive stored voltage profiles (e.g., a predetermined number of voltage profiles selected from the voltage profile 345) as the voltage profile to be used. The string selection circuit 320 can include a memory configured to store a predetermined number of voltage profiles for use in the arithmetically averaging. Selecting a voltage profile can trigger the string selection circuit 320 to discard (e.g., remove from memory) a voltage profile (e.g., an oldest cycle) so that only the predetermined number of voltage profiles is used in the arithmetic averaging.

Using the arithmetically averaged voltage profile can improve the operation of the driver system. For example, a smoother transition from one stored voltage profile to the next stored voltage profile can be achieved thus reducing and/or eliminating flicker associated with noise variation and/or line voltage variations cycle to cycle. Using the arithmetically averaged voltage profile technique described above together with the DC source 350 can prevent and/or reduce light flicker.

In an example implementation, the LED mesh 325 can include a LED configuration that includes a plurality of LEDs connected in series that are partitioned into a plurality of groups of LEDs. For example, at least one of LED string 330 and/or the LED string 335 can be partitioned into a group of LEDs. In this implementation, at least one down-stream group of LEDs can be selectively enabled while at least one up-stream group of LEDs are disabled. For example, at least one down-stream group of LEDs can correspond to (or be associated with) at least one up-stream group of LEDs. Control can progress from the down-stream-most group of LEDs, followed by the two down-streammost group of LEDs enabled until a portion and/or all of the groups of LEDs are enabled as the AC line voltage (e.g., line voltage 10) increases. This progression is then reversed until the down-stream-most group of LEDs is disabled. In addition, by using DC source 350, a third group of LEDs including the minimum number of LEDs (e.g., based on the DC source 350 voltage) can always be enabled.

For example, the string selection circuit 320 can use look-up table 340 to identify groups of LEDs (e.g., group 1, group 2, ... group n). The look-up table 340 can relate a group of LEDs to an address of at least one string of LEDs selected from LED string 330 and/or LED string 335. Initially, the string selection circuit 320 can be configured to enable a group of LEDs indicated as a base LED group in the look-up table 340. Then the string selection circuit 320 can be configured to progressively enable (e.g., address or turn on) and disable (e.g., not address or turn off) at least one group of LEDs using the look-up table 340 to select groups of LEDs from. The string selection circuit 320 can be configured to progressively enable (e.g., address or turn on) group 1; group 1 and group 2; group 1, group 2, and group 3; ...; group 1, group 2, and group 3, and ..., and group n and then progressively disable (e.g., not address or turn off) group n; group n and group n-1; group n, group n-1, and group n-2; ...; group n, group n-1, and group n-2, and ..., and group 1.

Using the progressively enabled and disabled groups of LEDs can improve the operation of the driver system. For example, progressively enabled and disabled groups of LEDs can simplify LED printed circuit board (PCB) layout, simplify and reduce cost for driver system control circuits, improve Power Factor, improve Total Harmonic Distortion (THDi), and/or the like. Using the progressively enabled and disabled groups of LEDs technique described above together with the DC source 350 can also prevent and/or reduce light flicker.

The look-up table 340 can be a look-up table, a file, a database and/or the like. The look-up table 340 can be indexed by voltage profile for use by the string selection circuit 320 to select individual LEDs, strings of LED lights and/or groups of LEDs in the LED mesh 325. The look-up table 340 can relate an address of at least one individual LED, strings of LED lights and/or groups of LEDs in the LED mesh 325 using the index and/or voltage profile. The voltage profile can be a single voltage profile, a continuously sampled voltage profile, and/or an arithmetically averaged voltage profile. The voltage profile can be live and/or stored voltage profile. The voltage profile can be based on one or more of the example implementations of voltage profiles described in detail above. The look-up table 340 can be implemented as a plurality of look-up tables implementing one or more of the described examples. Using the look-up table 340 can improve the operation of the driver system. For example, using the look-up table 340 can require less computation permitting use of lower cost processor.

As discussed above, the live and/or stored voltage profile can be stored based on a number of AC line cycles. In an example implementation, the number of AC line cycles can be an AC half-phase cycle. The live and/or stored voltage profile based on an AC half-phase cycle can be used to dynamically calculate voltage profiles, stored voltage profiles, voltage profiles stored in look-up table 340 and/or other look-up table 340 contents. The live and/or stored voltage profile based on an AC half-phase cycle (e.g., as look-up table 340 is updated and/or selected from) can be used to select individual LEDs, strings of LED lights and/or groups of LEDs in the LED mesh 325. The live and/or stored voltage profile based on an AC half-phase cycle can be used to maintain uniform LED power and light output with each AC half-phase despite AC line voltage variation.

Using the live and/or stored voltage profile based on an AC half-phase cycle can improve the operation of the driver system when compared to static current control levels. For example, using the live and/or stored voltage profile based on an AC half-phase cycle can provide more uniform light output and power consumption more independent of AC line voltage, reduced memory space and associated cost and/or the like. Further, using the live and/or stored voltage profile based on an AC half-phase cycle described above together with the DC source 350 can also prevent and/or reduce light flicker.

The time required to take each AC line voltage (e.g., line voltage 10) sample can introduce a delay between the time of the sample and when the sampled value is available to use for selecting individual LEDs, strings of LED lights and/or groups of LEDs. In an example implementation, the voltage level circuit 310 can determine and/or calculate a first derivative of the continuously sampled voltage (e.g., line voltage 10). The voltage level circuit 310 can be configured to communicate the first derivative of the continuously sampled voltage to the string selection circuit 320. The string selection circuit 320 can be configured to use the first derivative of the continuously sampled voltage to select individual LEDs, strings of LED lights and/or groups of LEDs. For example, string selection circuit 320 can be configured to retrieve control settings from the look-up table 340 to select individual LEDs, strings of LED lights and/or groups of LEDs based on current line voltage 10 conditions. Accordingly, the look-up table 340 can be indexed by first derivative as well as voltage profile (and other variables) for use by the string selection circuit 320 to select individual LEDs, strings of LED lights and/or groups of LEDs in the LED mesh 325.

Using the first derivative of the continuously sampled voltage can improve the operation of the driver system. For example, using the first derivative of the continuously sampled voltage can improve synchronization between the AC line voltage waveform and controlling the selection of individual LEDs, strings of LED lights and/or groups of LEDs in response to changes in the AC line voltage waveform. Further, using the first derivative of the continuously sampled voltage described above together with the DC source 350 can also prevent and/or reduce light flicker.

Figure 4:
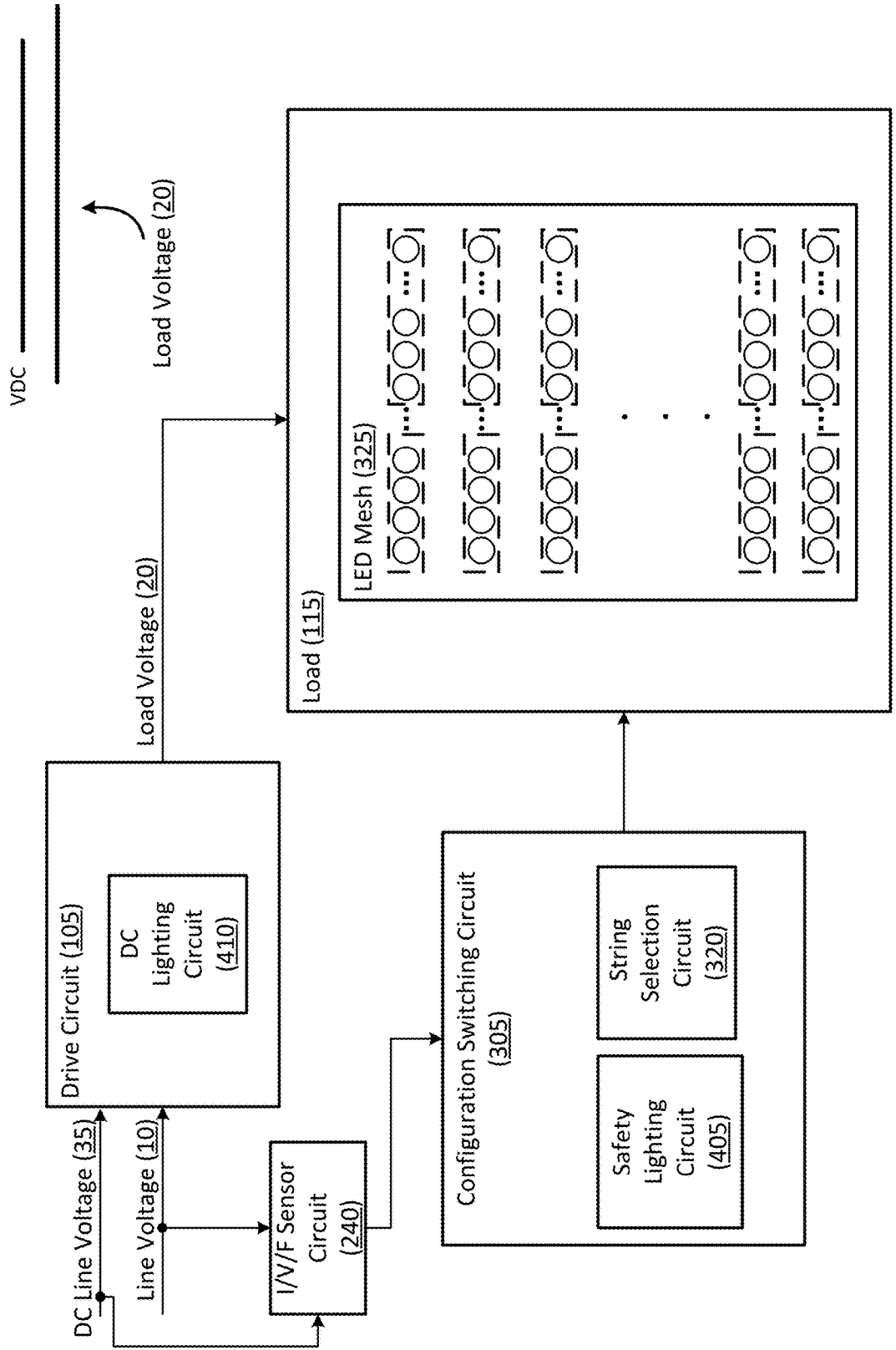
FIG. 4 illustrates another block diagram illustrating a portion of the driver system according to at least one example embodiment.

FIG. 4 illustrates another block diagram illustrating a portion of the driver system according to at least one example embodiment. As shown in FIG. 4 the portion of the driver system includes the drive circuit 105, the load 115, the I/V/F sensor circuit 240 and the configuration switching circuit 305. The configuration switching circuit 305 further includes a safety lighting circuit 405 and the drive circuit 105 further includes a DC lighting circuit 410. DC lighting circuit 410 can be configured to switch the load voltage 20 between the line voltage 10 and a DC line voltage 35. For example, in a source power failure mode (e.g., a building loses normal distribution power) the DC lighting circuit 410 can switch the load voltage 20 from the line voltage 10 to the DC line voltage 35.

The safety lighting circuit 405 can signal the string selection circuit to reduce a number of LED strings operating (e.g., on) in the LED mesh 325 to a minimum number of LED strings for safe visibility in order to reduce the load on, for example, a battery supplying the DC line voltage 35. Further, one or more of the DC lighting circuit 410 and/or the safety lighting circuit 405 can be configured to determine if the loss of line voltage 10 is a power failure or a shutdown for maintenance. If the power loss is a shutdown for maintenance, the DC lighting circuit may not switch to DC line voltage (e.g., it may stay in the disconnected line voltage 10 position or in a neutral position). Further, the safety lighting circuit 405 may select zero LED strings in the LED mesh 325.

Figure 5:
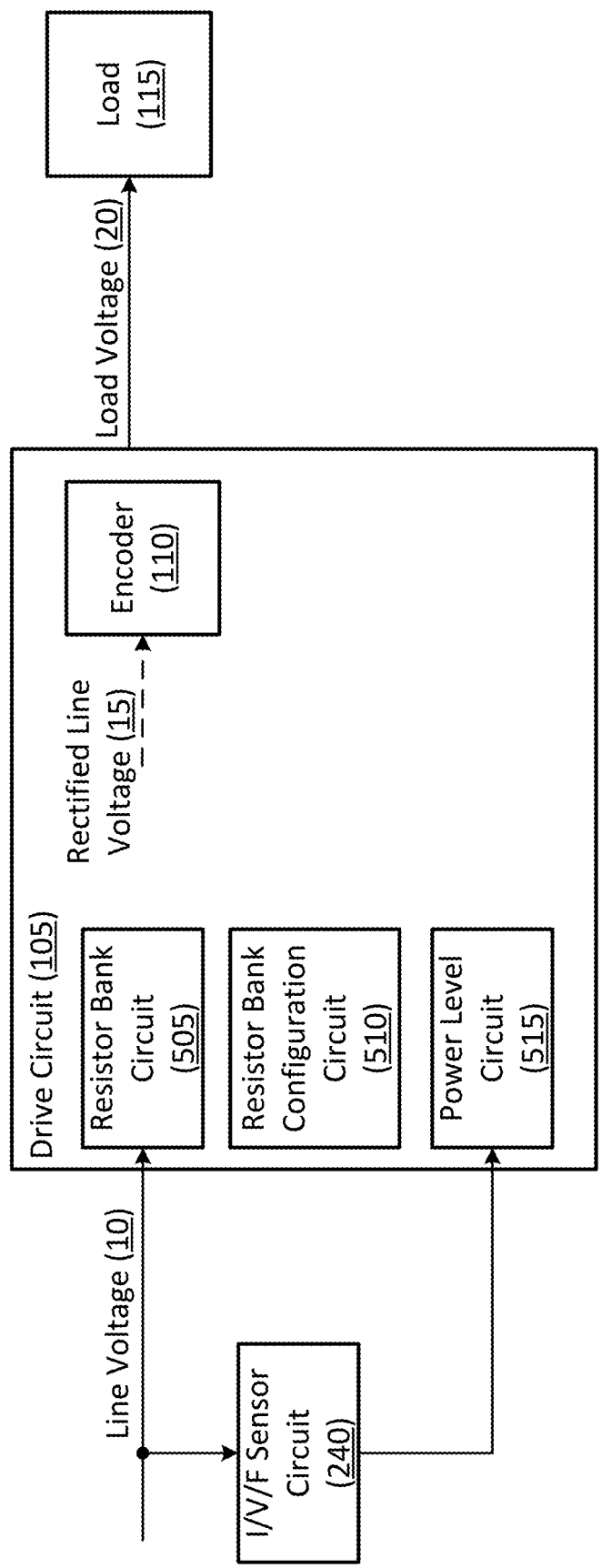
FIG. 5 illustrates another block diagram illustrating a portion of the driver system according to at least one example embodiment.

FIG. 5 illustrates another block diagram illustrating a portion of the driver system according to at least one example embodiment. As shown in FIG. 5 the portion of the driver system includes the drive circuit 105 and the load 115. The drive circuit 105 further includes a resistor bank circuit 505, a resistor bank configuration circuit 510 and a power level circuit 515. The resistor bank circuit 505 includes a plurality of resistors configured to selectively add and subtract load to drop power within the drive circuit. For example, power (e.g., Watts) associated with the line voltage 10 can be higher than the drive circuit 105 and/or the load 115 is configured to withstand. Therefore, the power level circuit 515 can use the I/V/F sensor circuit 240 and determine a power associated with line voltage 10. If the power is above a threshold power, the resistor bank configuration circuit 510 can add resistors in the resistor bank circuit 505 to drop power across. The amount of resistance that is added can be based on the determined power and the threshold value.

Figure 6:
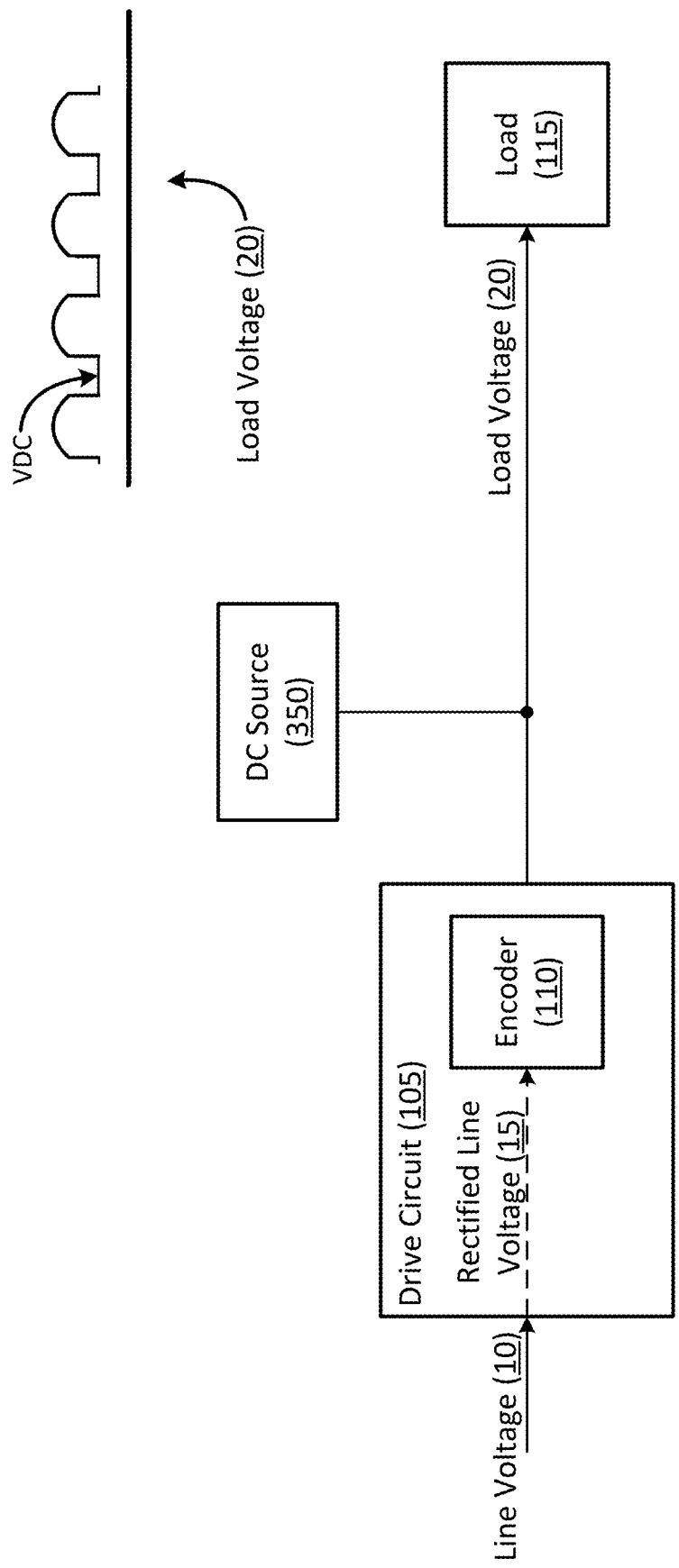
FIG. 6 illustrates another block diagram illustrating a portion of the driver system according to at least one example embodiment.

FIG. 6 illustrates another block diagram illustrating a portion of the driver system according to at least one example embodiment. As shown in FIG. 6 the portion of the driver system includes the drive circuit 105, the load 115 and a DC source 350. In this example implementation, the DC source 350 can be configured to prevent the load voltage 20 from reaching a zero voltage during a cycle. If the load 115 is a LED string or mesh, the DC source 350 can prevent or reduce light flicker. In example implementations, the DC source can be a battery and/or a capacitor.

Figure 7:
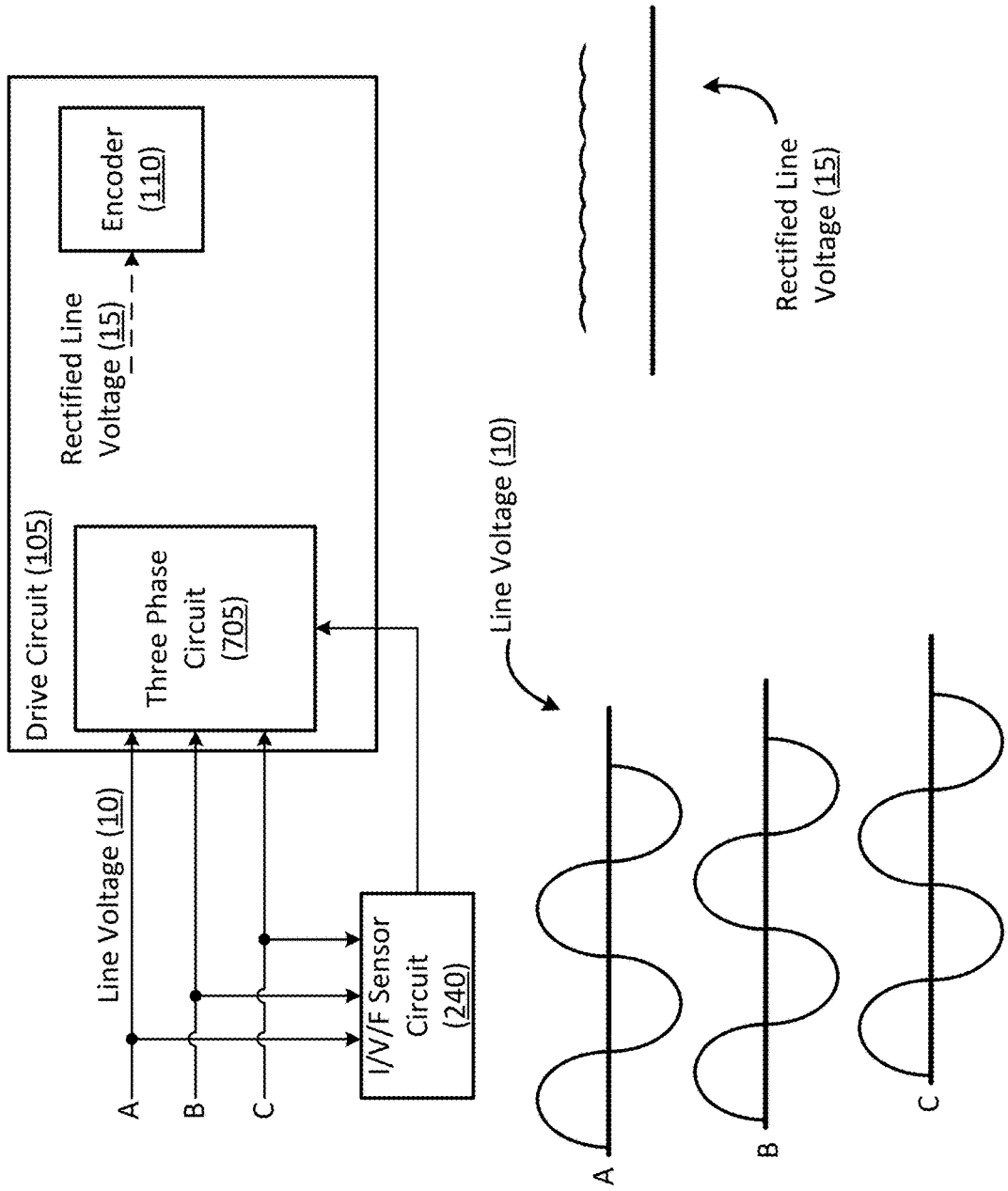
FIG. 7 illustrates another block diagram illustrating a portion of the driver system according to at least one example embodiment.

FIG. 7 illustrates another block diagram illustrating a portion of the driver system according to at least one example embodiment. As shown in FIG. 7 the portion of the driver system includes the drive circuit 105 and the IVF sensor circuit 240. The drive circuit further includes a three-phase circuit 705. The three-phase circuit 705 can be configured to generate the rectified line voltage 15 using a three-phase line voltage 10. The three-phase circuit can include a full-wave rectifier, a bridge rectifier, a transformer and/or the like. In this example implementation, the three-phase circuit 705 can be configured to prevent rectified line voltage 15 and the load voltage 20 from reaching a zero voltage during a cycle. If the load 115 is a LED string or mesh, the three-phase circuit 705 can prevent or reduce light flicker.

Any of the implementations described herein can be implemented with a three-phase line voltage 10. For example, each phase of the three-phase line voltage 10 can be continuously sampled allowing for any of the techniques that use a continuously sampled voltage to be implemented. For example, one or more of the continuously sampled voltage phases (or a stored version thereof) can be used for LED current control. For example, one or more of the continuously sampled voltage phases (or a stored version thereof) can be used for LED grouping control. For example, a DC voltage can be injected by a dimmer on one or more of the line voltage 10 phases during AC zero crossing periods. These are just a few example implementations. However, all (or a portion thereof) of the example implementations are within the scope of this disclosure.

Figure 8:
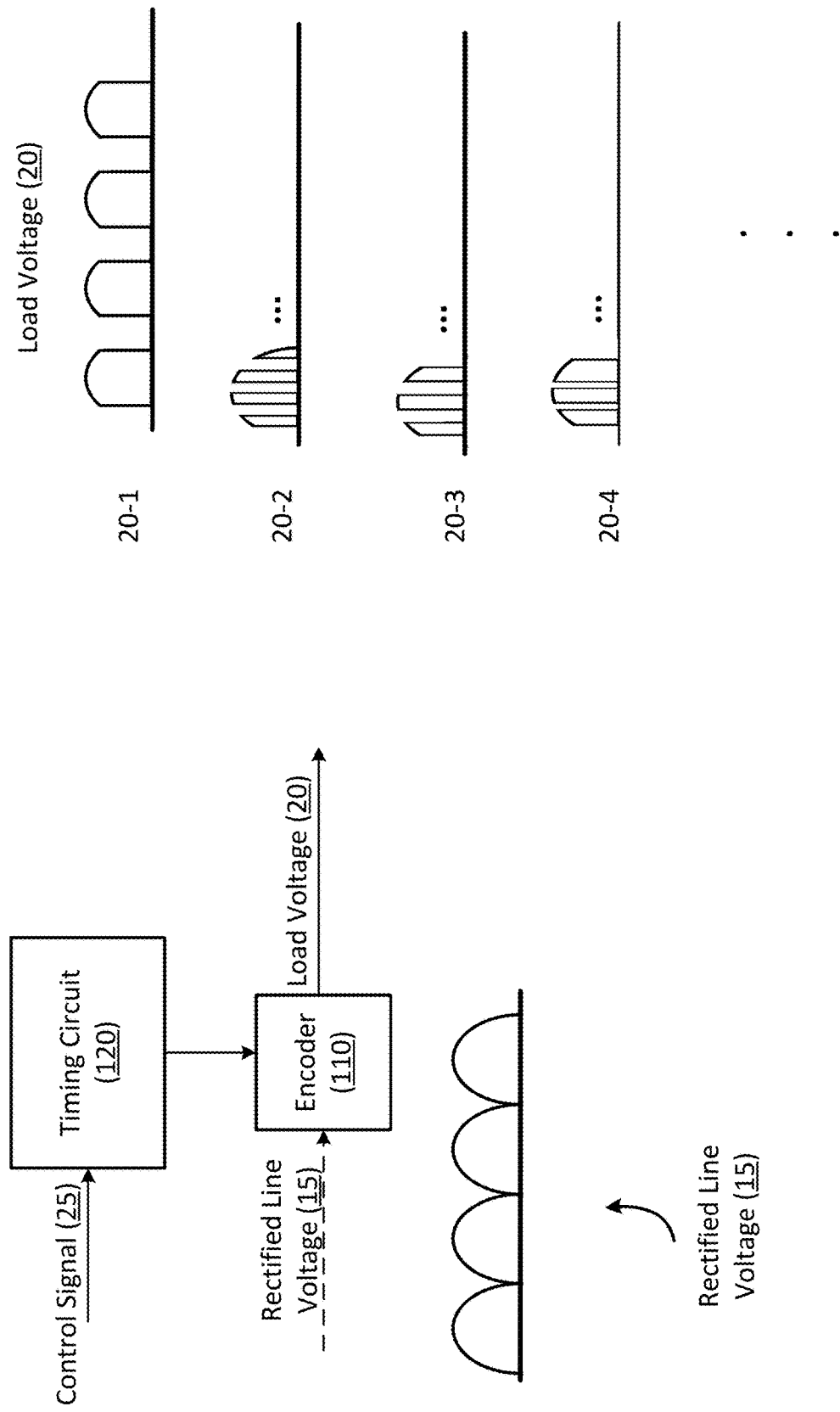
FIG. 8 illustrates another block diagram illustrating a portion of the driver system according to at least one example embodiment.

FIG. 8 illustrates another block diagram illustrating a portion of the driver system according to at least one example embodiment. As shown in FIG. 8 the portion of the driver system includes the timing circuit 120 and encoder 110. In addition, several examples of load voltage 20 are shown. Load voltage 20-1 illustrates a first example implementation with a symmetric on/off cycle. In this example, the load voltage 20-1 on-times a recentered on the voltage cycle peak and the off-times a recentered on the voltage cycle minimum or zero. Load voltage 20-2 illustrates a second example implementation with a constant on/off cycle. In this example, the load voltage 20-2 is on for a time period and off for a time period equal to the on-time period. Load voltage 20-3 illustrates a third example implementation combining a symmetric on/off cycle with a constant on/off cycle. In this example, the load voltage 20-3 includes a first off period that is centered on the voltage cycle minimum or zero. Then, the remaining on/off cycle is centered at the voltage cycle peak and is on for a time period and off for a time period that is equal to the on-time period. Load voltage 20-4 illustrates a fourth example implementation combining a symmetric on/off cycle with a variable on/off cycle. In this example, the load voltage 20-4 includes a first off period that is centered on the voltage cycle minimum or zero. Then, the remaining on/off cycle is centered at the voltage cycle peak and is on for a time period and off for a time period that is not equal to the on-time period. Different combinations of on/off periods are possible and within the scope of this disclosure.

The implementations shown in FIG. 8 can be controlled by the timing circuit 120 in response to the control signal 25. For example, the timing circuit 120 can include a lookup table that is used to select the load voltage 20 on/off periods. For example, the timing circuit 120 can include at least one algorithm that can be configured to implement the load voltage on/off periods based on the control signal 25.

Figure 9:
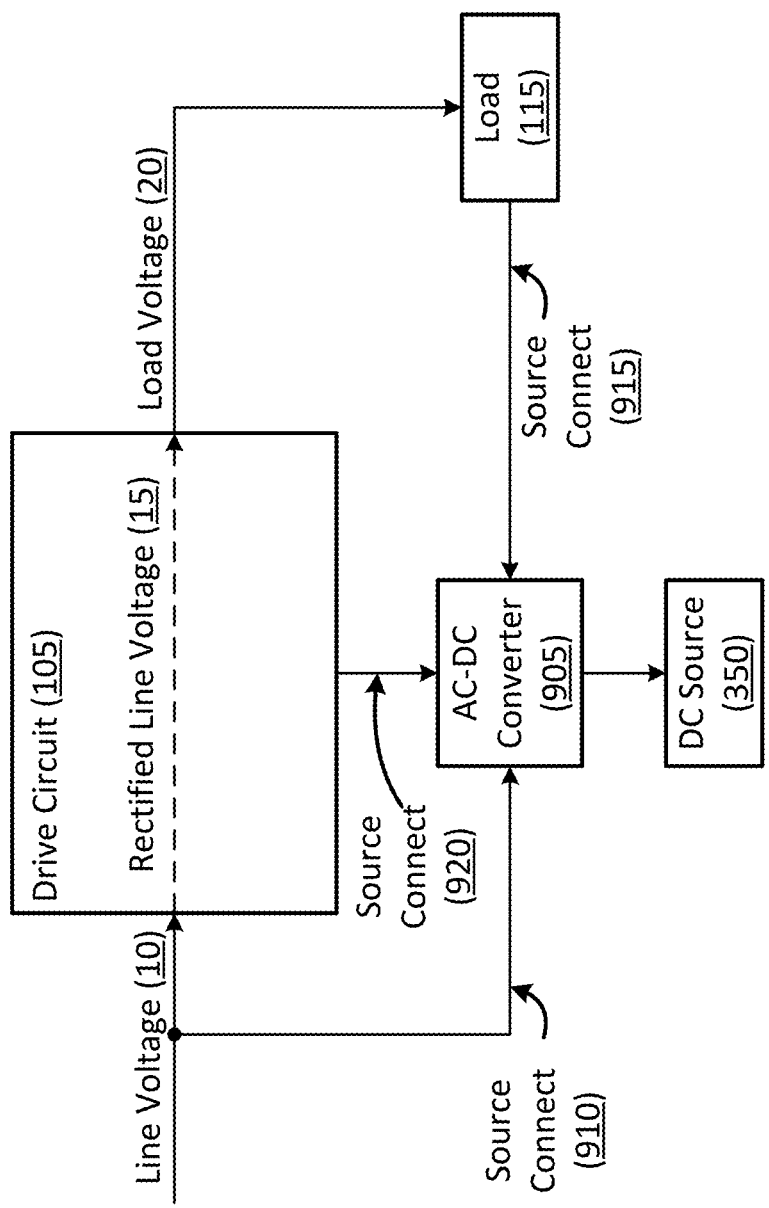
FIG. 9 illustrates a block diagram illustrating another portion of the driver system according to at least one example embodiment.

FIG. 9 illustrates a block diagram illustrating another portion of the driver system according to at least one example embodiment. As shown in FIG. 9, the driver system includes an AC-DC converter 905. The AC-DC converter 905 can be configured to receive an AC voltage (e.g., full-wave voltage and/or rectified voltage) and convert the AC voltage to a DC voltage compatible with the DC source 350. The DC voltage can be used to charge the DC source 350.

As shown in FIG. 9, the AC-DC converter 905 can be coupled to the line voltage 10 via source connect 910. Further, the AC-DC converter 905 can be coupled to the drive circuit 105 via source connect 920. In addition, the AC-DC converter 905 can be coupled to the load 115 via source connect 915. The AC-DC converter 905 can be implemented as a single element and/or multiple elements. For example, each of the source connect 910, source connect 915, and source connect 920 can have an associated AC-DC converter cumulatively referred to as AC-DC converter 905 and/or the source connect 910, source connect 915, and source connect 920 can be associated with a single AC-DC converter 905 and/or any combination thereof can be used. One of the source connect 910, source connect 915, and source connect 920 can be used to charge DC source 350 at any given time and/or combinations of the source connect 910, source connect 915, and source connect 920 can be used to charge DC source 350 at any given time. The AC-DC converter 905 can include a switching system (not shown) used to select at least one of the source connect 910, source connect 915, and/or source connect 920 to charge DC source 350 at any given time.

As was briefly discussed above, the DC source 350 can be charged using line voltage 10. In this implementation, the DC source 10 (via the AC-DC converter 905) appears as one of many loads on the line. Accordingly, the DC source 350 can draw power (e.g., current) as any load can.

Further, the DC source 350 can be charged using rectified line voltage 15. However, as discussed above, the encoder 110 can be used to filter (e.g., frequency filter) the rectified line voltage 15 and pass the DC source 350 during a LED mesh reconfiguration (e.g., while one or more LED is turned-off). Accordingly, the filtered rectified line voltage 15 can be used to charge the DC source 350. In this implementation, the encoder 110 can be configured to filter and redirect the rectified line voltage 15 to the source connect 920.

In another implementation, during a LED mesh reconfiguration the controller(s) 355 can be configured to switch off voltage applied to each LED, a LED string, a group of LED's, and/or the like. Accordingly, a switch (e.g., a MOSFET, a BJT and/or the like) can be coupled to each LED, a LED string, a group of LED's, and/or the like. The controller(s) 355 can cause a voltage to be applied to the switch causing the switch to open or close.

When the switch/switches is/are open, the load voltage 20 (e.g., for the LED, LED string, group of LED's, and/or the like) can be used to charge the DC source 350. In this implementation, the controller(s) 355 can be configured to redirect the load voltage 20 (e.g., for the LED, LED string, group of LED's, and/or the like) to the source connect 915. In an example implementation, the controller(s) 355 can be configured to redirect the load voltage 20 input to the source connect 920.

When the rectified line voltage 15 and/or load voltage 20 is removed from the load (e.g., as a whole or to a LED, LED string, group of LED's, and/or the like), the power is typically dropped across another device for a period of time. This can cause heat to be generated in the device. In some cases, the device is configured as a heat sink. For example, a resistor can be used as a heat sink. Other devices may be damaged causing failure or reduced useful life due to the heat generation. For example, a MOSFET or BJT switch can be damaged by heat.

Therefore, in an implementation using a switch (e.g., MOSFET) to turn-off LED's when reconfiguring the LED mesh 325 to match the AC input voltages, each switch (e.g., MOSFET) can generate heat because each switch (e.g., MOSFET) is operating very fast and power is being dropped across the switch (e.g., MOSFET). In other words, the power is not being applied to the LED array in the form of light while the switch (e.g., MOSFET) is off. Instead, the power is dumped into the switch (e.g., MOSFET).

Referring to AC-mode and DC-mode operation described above, in this implementation, power associated with the AC-mode that would otherwise be wasted (e.g., converted to heat) during DC-mode operation can be used. In other words, the power that would otherwise be dumped into a sink or the switch (e.g., MOSFET) can be redirected, via source connect 915, to charge the DC source 350. This can be a more efficient use of power and can reduce heat generation in the switch (e.g., MOSFET) thus extending the life of the system.

Figure 10:
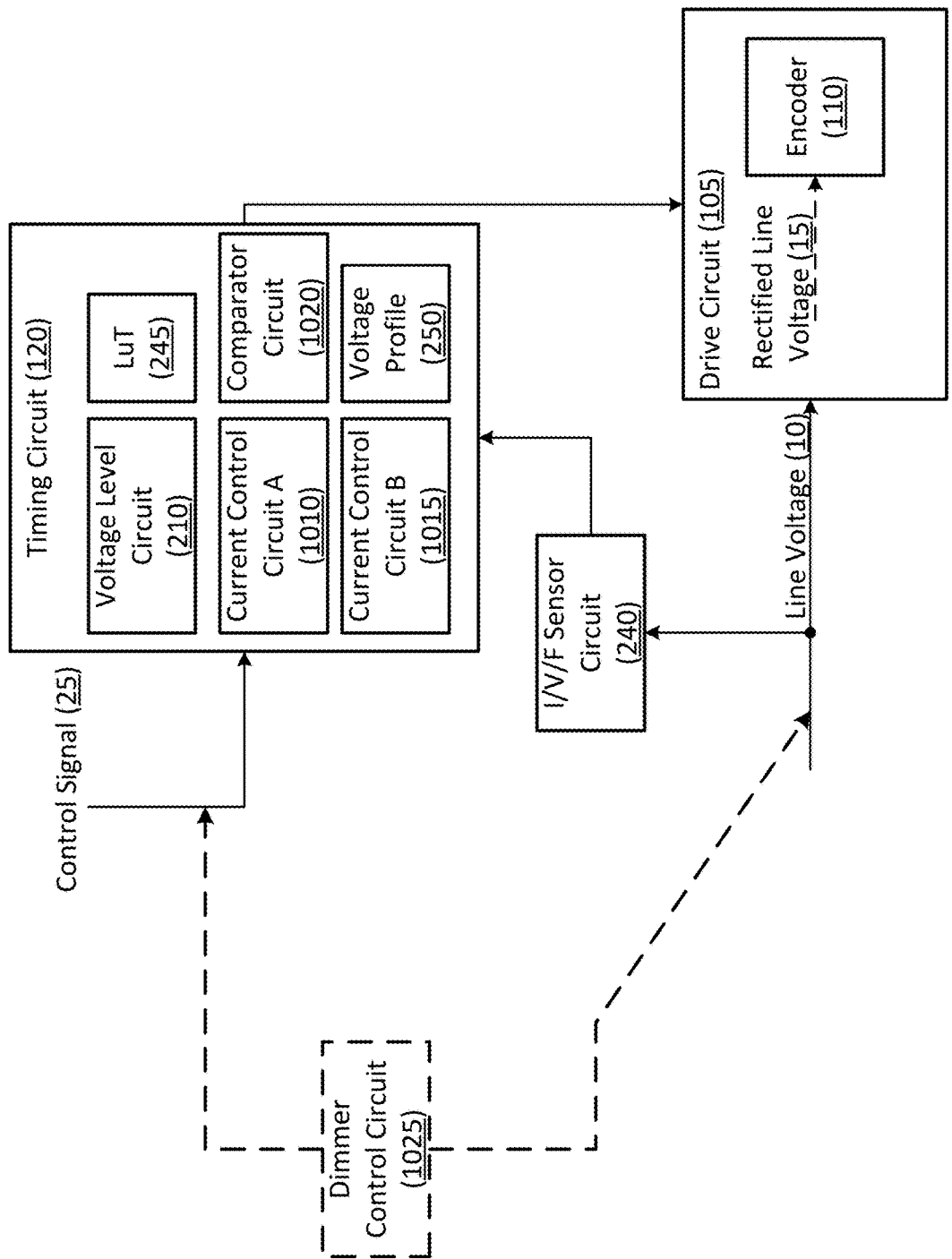
FIG. 10 illustrates another block diagram illustrating a portion of the driver system according to at least one example implementation.

FIG. 10 illustrates another block diagram illustrating a portion of the driver system according to at least one example implementation. As shown in FIG. 10, the timing circuit includes the voltage level circuit 310, a current control circuit A 1010, a current control circuit B 1015, a comparator circuit 1020, a dimmer control circuit 1025, and the look-up table 340. The current control circuit A 1010 and the current control circuit B 1015 can be implemented as one control circuit. The current control circuit A 1010 and the current control circuit B 1015 can be configured to control current flow through the LEDs in the load 115 (e.g., in strings, groups and/or individually).

In an example implementation, the voltage level circuit 310 can detect (determine and/or calculate) a single voltage (e.g., peak voltage, a common-mode voltage, an average voltage, a root mean square (RMS) voltage and the like) associated with the line voltage 10. In this implementation, the current control circuit A 1010 and/or the current control circuit B 1015 can be configured to automatically configure controlling the load 115 for nominal voltage (e.g., 120 VAC or 277 VAC) operation. Automatic control can be an improvement over to factory switch setting and component changes because automatic control can allow for a single product for multiple/all nominal voltage systems.

In an example implementation, the voltage level circuit 310 can detect (determine and/or calculate) a single voltage (e.g., peak voltage, a common-mode voltage, an average voltage, a root mean square (RMS) voltage and the like) associated with the line voltage 10. In this implementation, the current control circuit A 1010 can be configured to control current using a fixed-time-based algorithm. The fixed-time-based algorithm can cycle the current on for a fixed period and off for a fixed period of time (e.g., on-off-on-off . . . ). The look-up table 340 can store the fixed-time-based algorithm. The look-up table 340 can use a use a voltage and/or a value based on the control signal 25 (e.g., in combination) as key to retrieve the fixed-time-based algorithm. In this implementation, the voltage can be signaled by the voltage level circuit 310 in an initialization routine and remain constant during operation. The single voltage technique does not accommodate line voltage variations (e.g., line voltage changes resulting from based grid conditions and/or local power utilization).

In an example implementation, the voltage level circuit 310 can detect (determine and/or calculate) a continuously sampled voltage (e.g., peak voltage, a common-mode voltage, an average voltage, a root mean square (RMS) voltage and the like) associated with the line voltage 10. The continuously sampled voltage can be communicated to the current control circuit B 1015 continuously and/or on a regular (e.g., in small time increments, <1 sec, <10 sec) basis. In this implementation, the current control circuit B 1015 can be configured to control current using a voltage-based algorithm. The voltage-based algorithm can cycle the current on and off based on the voltage.

In a first technique, the look-up table 340 can store a time-based algorithm and the current control circuit B 1015 can be configured to continuously and/or regularly look up the time-based algorithm based on the continuously sampled voltage. The look-up table 340 can use a use a voltage and/or a value based on the control signal 25 (e.g., in combination) as key to retrieve the time-based algorithm. In a second technique, a sampled voltage value can trigger a cycle of the current (e.g., on to off and/or off to on). For example, the look-up table 340 can store a voltage increment/decrement (or absolute) value (e.g., 1V, 2V, 5V, 10V, −1V, −2V, −5V, −10V and the like). The current control circuit B 1015 can be configured to look up the voltage increment/decrement (or absolute) value(s) based on the control signal 25. As the line voltage 10 waveform progresses through voltages, in response to a sampled voltage being equal to one of the incremental (or absolute) values, the current control circuit B 1015 can be configured to cause the current to cycle (e.g., on to off and/or off to on).

The use of the continuously sampled line voltage 10 (e.g., AC line-voltage input) to control LED current can accommodate for line voltage variations which can be an improvement over time-based LED current control that does not accommodate for line voltage variations. For example, improvements can include improved Power Factor and Total Harmonic Distortion (THDi), increased power efficiency, increased light output efficiency, decreased heat generation in the driver system and/or the load and lower thermal management costs and/or the like.

In an example implementation, continuously sampled voltage (e.g., line voltage 10) can be periodically stored. In this implementation, the current control circuit B 1015 can use the stored continuously sampled voltage to control current instead of using a live continuously sampled voltage. For example, the voltage profile 345 can be (or include) a computer memory. The continuously sampled voltage can be stored in the voltage profile 345 as a stored voltage profile. The voltage profile 345 can be configured to store at least one continuously sampled voltage captured over a period of time (e.g., a number of AC line cycles).

For example, the voltage profile 345 can include a first stored voltage profile as a stored continuously sampled voltage and a second stored voltage profile as a continuously sampled voltage in the process of being captured. The first stored voltage profile can be used by the current control circuit B 1015 to control current. In response to ending the capturing of the second stored voltage profile (e.g., the number of AC line cycles for a voltage profile have been captured), the current control circuit B 1015 can trigger the use of the second stored voltage profile to control current and the first stored voltage profile can be discarded. In other words, the voltage profile 345 can be (or include) a memory queue from which the string selection circuit 320 selects a stored voltage profile. Using the stored voltage profile can improve the operation of the driver system. For example, using the voltage profile can be more stable base for determining control than using live samples, allow more effective and less costly filtering of AC line noise, reduce and/or eliminate flicker associated with AC line noise, and/or the like.

In an example implementation, a plurality of stored voltage profiles can be arithmetically averaged. In this implementation, the plurality of stored voltage profiles can be successive (or contiguous) continuously sampled voltages (e.g., line voltage 10). The voltage profile 345 and/or the current control circuit B 1015 can be configured to calculate an arithmetically averaged voltage profile. In this implementation, the arithmetically averaged voltage profile can be used by the current control circuit B 1015 to control current instead of a single sampled voltage profile.

For example, prior to storing a voltage profile in the memory queue, the voltage profile 345 can arithmetically average a plurality of successive continuously sampled voltages (e.g., a predetermined number of contiguous AC line cycles) as the voltage profile to be stored. In response to ending the capturing of a voltage profile (e.g., the number of AC line cycles for a profile have been captured), the voltage profile 345 can trigger the arithmetically averaging and storing of a voltage profile. The voltage profile 345 can include a memory configured to store a predetermined number of previous (e.g., prior in time) contiguous AC line cycles for use in the arithmetically averaging. The arithmetically averaged contiguous AC line cycles can be stored as a stored voltage profile. Storing a voltage profile can trigger the voltage profile 345 to discard (e.g., remove from memory) a contiguous AC line cycle (e.g., an oldest cycle) so that only the predetermined number of previous contiguous AC line cycles is used in the arithmetically averaging.

For example, prior to using a voltage profile to control current, the current control circuit B 1015 can arithmetically average a plurality of successive stored voltage profiles (e.g., a predetermined number of voltage profiles selected from the voltage profile 345) as the voltage profile to be used. The current control circuit B 1015 can include a memory configured to store a predetermined number of voltage profiles for use in the arithmetically averaging. Selecting a voltage profile can trigger the current control circuit B 1015 to discard (e.g., remove from memory) a voltage profile (e.g., an oldest cycle) so that only the predetermined number of voltage profiles is used in the arithmetically averaging.

Using the arithmetically averaged voltage profile can improve the operation of the driver system. For example, the arithmetically averaged voltage profile can allow for a smoother transition from one stored voltage profile to the next stored voltage profile can be achieved thus reducing and/or eliminating flicker associated with radical (e.g., noise variation and/or line voltage variations) cycle to cycle.

The look-up table 340 can be a look-up table, a file, a database and/or the like. The look-up table 340 can be indexed by voltage profile for use by the current control circuit A 1010 and/or the current control circuit B 1015 to control current. The look-up table 340 can relate an address of at least one individual LED, strings of LED lights and/or groups of LEDs in the LED mesh 325 using the index and/or voltage profile. The voltage profile can be a single voltage profile, a continuously sampled voltage profile, and/or an arithmetically averaged voltage profile. The voltage profile can be live and/or stored voltage profile. The voltage profile can be based on one or more of the example implementations of voltage profiles described in detail above. The look-up table 340 can be implemented as a plurality of look-up tables implementing one or more of the described examples. Using the look-up table 340 can improve the operation of the driver system. For example, using the look-up table 340 can require less computation permitting use of lower cost processor.

As mentioned above, the live and/or stored voltage profile can be stored based on a number of AC line cycles. In an example implementation, the number of AC line cycles can be an AC half-phase cycle. The live and/or stored voltage profile based on an AC half-phase cycle can be used to dynamically calculate voltage profiles, stored voltage profiles, voltage profiles stored in look-up table 340 and/or other look-up table 340 contents. The live and/or stored voltage profile based on an AC half-phase cycle (e.g., as look-up table 340 is updated and/or selected from) can be used to control current. The live and/or stored voltage profile based on an AC half-phase cycle can be used to maintain uniform LED power and light output with each AC half-phase despite AC line voltage variation. Using the live and/or stored voltage profile based on an AC half-phase cycle can improve the operation of the driver system when compared to static current control levels. For example, using the live and/or stored voltage profile based on an AC half-phase cycle can provide uniform light output and power consumption independent of AC line voltage, reduced memory space and associated cost and/or the like.

The time required to take each AC line voltage (e.g., line voltage 10) sample can introduce a delay between the time of the sample and when the sampled value is available to use for LED current control. In an example implementation, the voltage level circuit 310 can determine and/or calculate a first derivative of the continuously sampled voltage (e.g., line voltage 10). The voltage level circuit 310 can be configured to communicate the first derivative of the continuously sampled voltage to the current control circuit B 1015. The current control circuit B 1015 can be configured to use the first derivative of the continuously sampled voltage to control current to the load 115. For example, current control circuit B 1015 can be configured to retrieve control settings from the look-up table 340 to control or instruct the drive circuit 105 based on current line voltage 10 conditions. Accordingly, the look-up table 340 can be indexed by first derivative as well as voltage profile (and other variables) for use by the current control circuit B 1015 to select control variables for current control. Using the first derivative of the continuously sampled voltage can improve the operation of the driver system. For example, using the first derivative of the continuously sampled voltage can improve synchronization between the AC line voltage waveform and controlling current in response to changes in the AC line voltage waveform.

Effectively (or efficiently) using a rectified AC input half-sine wave (e.g., rectified line voltage 15) to power a load (e.g., load 115) including an LED (e.g., LED mesh 325, LED string 330, LED string 335, and/or an associated individual LED) can require a repeatable input timing reference from cycle-to-cycle in order to ensure synchronization. For example, a timing offset (even bay a very small fraction of a wavelength) between LED control timing and the rectified AC input half-sine wave used to power the load including the LED from one AC cycle to the next can result in visible flicker.

In an example implementation, comparator circuit 1020 can be configured to generate a control signal (e.g., a timing reference) used to synchronize the continuously sampled voltage, the stored continuously sampled voltage, and/or a derivation thereof (e.g., a live and/or stored voltage profile) with the AC line-voltage input (e.g., line voltage 10). The AC line-voltage input may be used because using an independent time base to establish synchronization from one cycle to the next may not be sufficient (e.g., accurate or consistent) because typically the time base and/or the AC line-voltage input may not be stable over indefinite periods of time.

Further, a logical reference point in each cycle could be the AC zero-crossing of the AC line-voltage input (e.g., line voltage 10). However, detecting the AC line zero crossing with sufficient repeatability can be difficult because the AC line zero crossing has the smallest signal amplitude during the cycle. As a result, the AC line zero crossing can have the worst signal-to-noise ratio of the AC line-voltage input waveform. Noise can introduce random errors. Therefore, detection of the AC line zero crossing in the AC line-voltage input can introduce random errors resulting in insufficient repeatability of the control signal or timing reference.

In an example implementation, comparator circuit 1020 can be configured to use a fixed voltage reference to generate a precise-enough and repeatable-enough control signal. The fixed voltage reference can be far enough away (e.g., on the positive cycle and/or negative cycle) from the zero-crossing to reduce sensitivity to noise. In addition, the fixed voltage reference can be set low enough so that the comparator circuit 1020 triggers the control signal before the AC line-voltage input is high enough to power an LED. In other words, the fixed voltage reference can be set to a value above zero (0) and below the forward voltage drop $V_F$ or turn-on voltage for the LED (e.g., a LED in LED mesh 325).

The fixed voltage reference can be set to a value just below the forward voltage drop $V_F$ or turn-on voltage for the LED to minimize noise and to trigger the control signal before a LED turns on (e.g., emits light). It should be noted that the AC line-voltage input (e.g., line voltage 10) can cycle at a frequency that causes the LED to turn off and to turn back on without the human eye noticing the cycle (e.g., without noticeable flicker). Using a comparator with a non-zero reference voltage can improve the operation of the driver system. For example, using the comparator with the non-zero reference voltage can improve synchronization between the AC line voltage waveform and controlling current during normal operation, in response to changes in the AC line voltage waveform and in response to changes in desired light output (e.g., dimming).

The dimmer control circuit 1025 is illustrated using a dashed line because the dimmer control circuit 1025 can be a (likely a significant) distant from the driver system. For example, the dimmer control circuit 1025 could be an element of a remote control system that is miles away from a light fixture including the driver system. For example, the dimmer control circuit 1025 could be mounted on (or in) a wall a significant distance away (even in another room or building) from a light fixture including the driver system.

The dimmer control circuit 1025 can be configured to be operated by a user in order to generate a signal (e.g., a voltage level) configured to change (e.g., reduce or increase) an output of a light. The signal can be communicated via the control signal 25. The signal can be communicated on the line voltage 10 (e.g., as a voltage that does not interfere with the AC line voltage waveform). In an example implementation an intermediate controller (not shown) could interface between the dimmer control circuit 1025 and the control signal 25 and/or the line voltage 10. In a simplified implementation, the dimmer control circuit 1025 can be configured to directly generate the control signal 25. As the signal output from the dimmer control circuit 1025 is varied, control signal 25 can be generated such that the timing circuit 120 causes more off periods and/or longer off periods (to reduce power) or less off periods and/or shorter off periods (to increase power from a reduced power state) during a cycle. This varies power to the load 115. For example, the varied power can cause the LED mesh 325, the LED string 330, the LED string 335, an LED group including at least one of the LED string 330 and/or the LED string 335, and/or an individual LED thereof to variably dim (reduce/increase light).

In an example implementation, the dimmer control circuit 1025 can be a continuously sampled low voltage (e.g., 0-10 v) controller. For example, the dimmer control circuit 1025 can be a variable resistor, a rheostat, a Pulse Width Modulation (PWM) dimmer, a semi-conductor device, and/or the like. Use of a continuously sampled low voltage control input received from the dimmer control circuit 1025 and changing current control levels to LEDs (e.g., by the current control circuit A 1010 and/or the current control circuit B 1015) to generate more or less light commensurate with the value of the low voltage (e.g., 0 v=off or most dim state and 10 v=maximum or full intensity state) can be a low cost implementation that is also compatible with pre-existing dimmer controls.

In an example implementation, the voltage level circuit 310 can detect (determine and/or calculate) DC voltage injected by the dimmer control circuit 1025 during AC zero crossing periods (e.g., of the line voltage 10) while continuously sampling voltage (e.g., line voltage 10). The voltage level circuit 310 can be configured to communicate the DC voltage to the current control circuit A 1010 and/or the current control circuit B 1015. The current control circuit A 1010 and/or the current control circuit B 1015 can be configured to change current control levels to the drive circuit 105 based on the sampled DC voltage. The drive circuit 105 can be configured to increase and/or decrease LED light output to a level commensurate with detected DC voltage based on the changed current control levels by adjusting current control. In other words, the DC voltage injected by the dimmer control circuit 1025 can override and/or be substituted for the control signal 25 (with regard to dimmer control) as discussed above. Using the DC voltage injected by an upstream dimmer circuit during AC zero crossing periods can improve the operation of the driver system. For example, using the DC voltage injected by an upstream dimmer circuit during AC zero crossing periods can provide low cost compatibility with pre-existing dimmer controls and/or controllers.

In an example implementation, the continuously sampled voltage (e.g., line voltage 10) can be used to detect a dimming operation. For example, the voltage level circuit 310 can detect a power cycle pattern in the continuously sampled voltage (e.g., during live sampling). The power cycle pattern can be, for example, a series of on and off power cycles. A number and/or duration of the on and off transitions in the context of a cyclical power interruption can indicate dimming control input. When continuous power is restored, the LED control current is set to provide a light level based on the dimming control input. For example, the current control circuit A 1010 and/or the current control circuit B 1015 can control current based on the dimming control input. Using the continuously sampled voltage to detect a dimming operation can improve the operation of the driver system. For example, using the continuously sampled voltage to detect a dimming operation can provide a dimming control input without additional hardware or electronics beyond the existing switch.

In an example implementation, the power cycle pattern in the continuously sampled voltage can indicate a preferred light intensity level. For example, an illumination progression from the lowest illumination (most dim state) to the highest illumination (full intensity) state can be initiated by a first off/on cycle pattern (e.g., as detected by the voltage level circuit 310) the LED lights can be dimmed to the lowest illumination (most dim state). The illumination state can automatically increase (e.g., in a timed interval) through the progression (e.g., as controlled by the current control circuit A 1010 and/or the current control circuit B 1015). In response to detection of a second off/on cycle pattern of the continuously sampled voltage (e.g., by the voltage level circuit 310) during the progression, the LED lights can be permanently left on at the illumination level during which the sequence-interrupting second off/on cycle pattern was detected. If no sequence-interrupting second off/on cycle pattern is detected, the lights can be set to remain on at the highest illumination level.

This illumination progression can permit a user to initially cycle the light switch to initiate the preferred light intensity level progression (e.g., from any initial light intensity state), observe the progressively increasing light intensity, and then cycle the light switch off and on again when the desired intensity is observed to select that intensity. The desired intensity would then be preserved until the light switch is turned off. Using the preferred light intensity level progression dimming operation can improve the operation of the driver system. For example, using the preferred light intensity level progression dimming operation can provide a dimming control input without additional hardware or electronics beyond the existing switch.

Figure 11A:
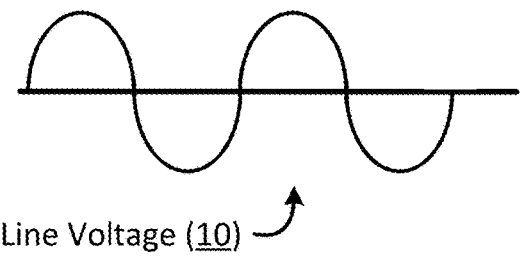
FIGS. 11A to 11F illustrate various voltage waveforms of the driver system according to at least one example embodiment.
Figure 11B:
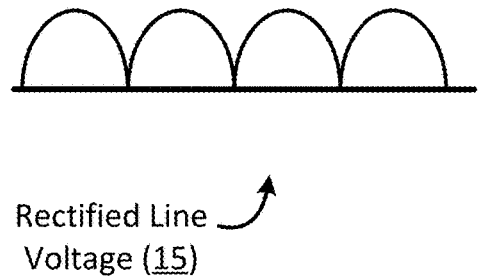
Figure 11C:
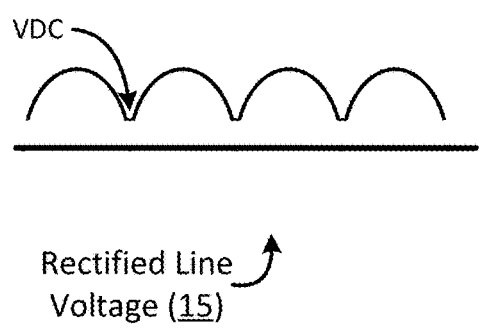
Figure 11D:
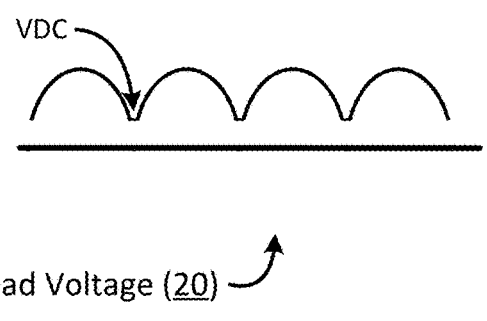
Figure 11E:
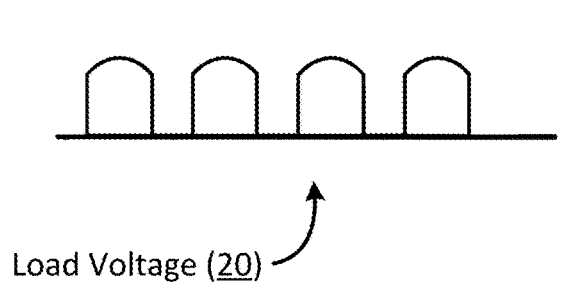
Figure 11F:
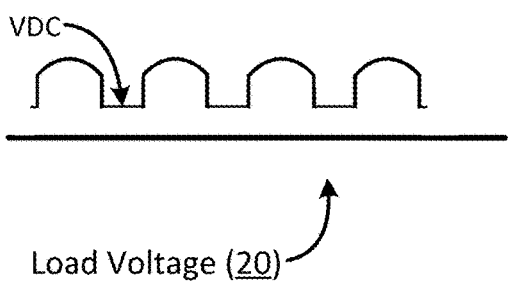

FIGS. 11A to 11F illustrate various voltage waveforms of the driver system according to at least one example embodiment. FIG. 11A illustrates an example line voltage 10. FIG. 11B illustrates an example rectified line voltage 15. FIG. 11C illustrates an example rectified line voltage 15 together with a DC voltage associated with DC source 350. FIG. 11D illustrates an example load voltage 20 together with a DC voltage when the rectified line voltage 15 is as shown in FIG. 11C. FIG. 11E illustrates an example load voltage 20 with power reduced by encoder 110. FIG. 11F illustrates an example load voltage 20 with power reduced by encoder 110 together with a DC voltage when the rectified line voltage 15 is as shown in FIG. 11C.

Figure 12:
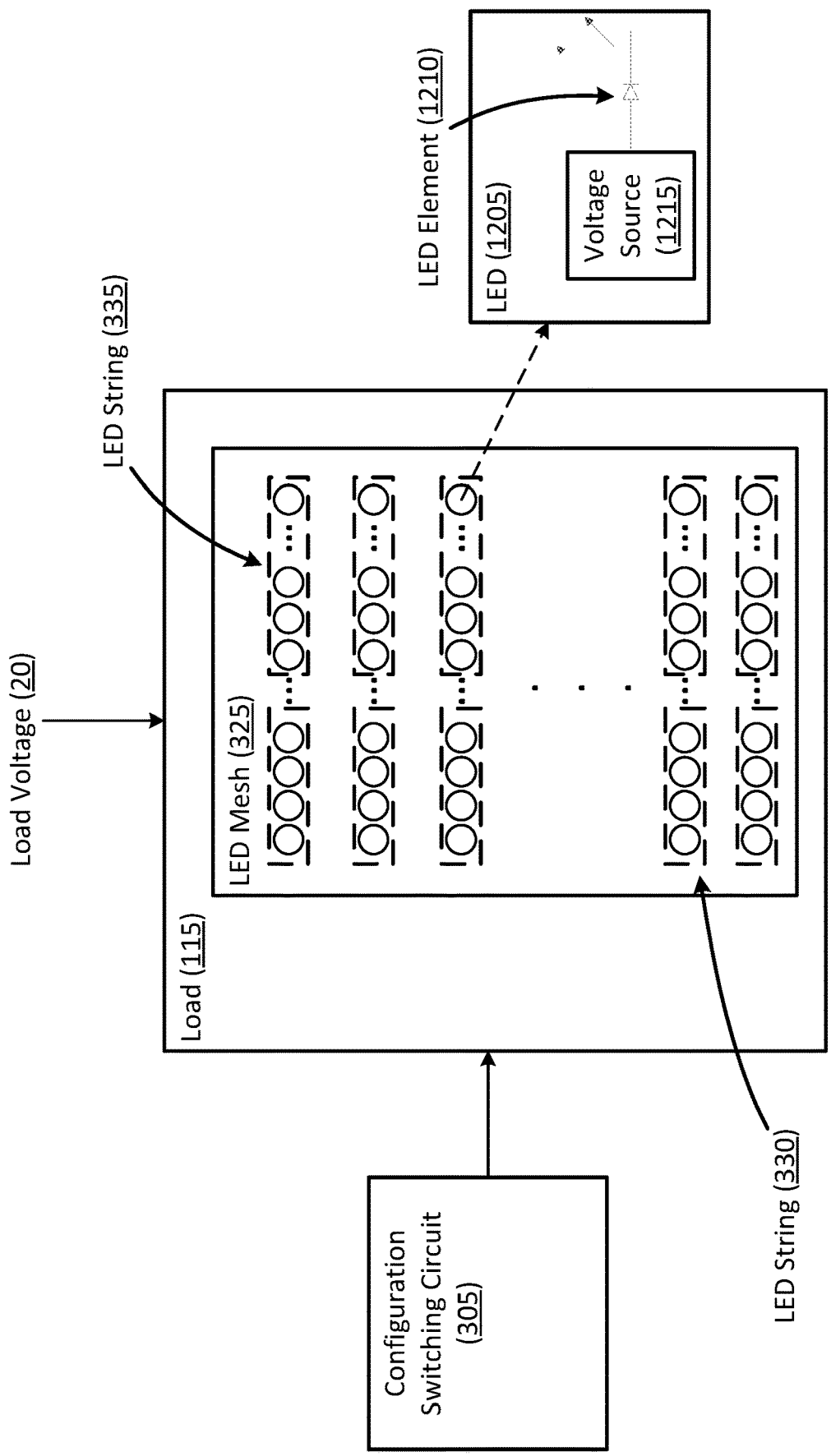
FIG. 12 illustrates is a block diagram of an example of a light emitting diode (LED) according to at least one example embodiment.

FIG. 12 illustrates is a block diagram of an example of a light emitting diode (LED) according to at least one example embodiment. As shown in FIG. 12 a LED included in a LED mesh (e.g., LED mesh 325) can be LED 1205. LED 1205 can include an LED element 1210 and a voltage source 1215. As discussed above, LED's are current-dependent devices. Accordingly, a forward voltage drop $V_F$ or turn-on voltage is applied before light can emit from the LED. The turn-on voltage can depend on the semiconductor compound (e.g., light color) and on the forward biased LED current. Most common LED's require a forward operating voltage of between approximately 1.2 to 3.6 volts. Should the voltage applied to the LED drop below the forward operating voltage, the LED can turn-off. The LED turning off can cause flicker as discussed above.

As discussed above the rectified line voltage 15 (and thus the load voltage 20) can reach a zero voltage during a cycle. Therefore, voltage source 1215 can be configured to maintain the voltage applied to the LED element 1210 above the forward operating voltage of the LED element 1210. Accordingly, voltage source 1215 can be configured to prevent the LED element 1210 from turning off at a point in time (e.g., during the cycle) when the load voltage 20 drops below the forward operating voltage of the LED element 1210.

The voltage source 1215 can be a storage device. For example, voltage source 1215 can be a capacitor, an inductor, a semiconductor, a magnet, and/or the like. The voltage source 1215 can be a small capacitor or small semiconductor device because the LED element 1210 can have a small forward operating voltage (e.g., between approximately 1.2 to 3.6 volts). For example, if the voltage source 1215 is a capacitor, the capacitor may only store a voltage slightly above (e.g., to allow a variability margin) the forward operating voltage (e.g., 4 volts). Further, the time period that the load voltage 20 drops below the forward operating voltage of the LED element 1210 can be very short. Therefore, the storage capacity can be small due to having to hold the voltage of the capacitor for a short period of time.

Having a small capacitor in the LED 1205 may minimally add cost to the LED 1205 as compared to the cost of the LED element 1210. For example, the voltage source 1215 can be formed during the manufacturing (e.g., on wafer) of the LED element 1210 thus forming the LED 1205. Including at least one (e.g., as all, a plurality of, a portion of, or the like) LED 1205 in LED string 330 and/or LED string 335 can minimize and/or eliminate flicker in LED mesh 325.

FIGS. 13A, 13B and 13C show an example of a light system and a light fixture according to at least one example embodiment. As shown in FIG. 13A the light system includes a light fixture 1305. The light fixture 1305 includes a plurality of LED's 1310 as one or more LED strings and/or meshes and a plurality of component locations 1315 each including one or more components (e.g., ASIC's, resistors, transistors, conduction paths, interconnectors and/or the like). The light fixture 1305 can be a single unit including most or all components functions for operating/controlling an LED light. These components can include some or all of the features discussed above and other features, standard or otherwise.

As shown in FIG. 13B the light system further includes a light diffuser 1320. The light diffuser 1320 can be configured to diffuse the light generated by the plurality of LED's 1310. By diffusing the light generated by the plurality of LED's 1310, one or more of the plurality of LED's 1310 can be turned off (e.g., as part of a dimming process, power save configuration and/or a variable voltage/power configuration) without a viewer of the light being able to see that one or more LED's is not on.

In an example implementation, the plurality of LED's 1310 can emit blue light and share a light diffuser 1320 including a distributed yellow phosphor coating. The phosphor coating can scatter and diffuses the light from the LEDs. In addition, the phosphor can actively emits light of its own as it is excited by the blue LED light. Therefore, light diffuser 1320 can exhibit passive and/or active light emission smoothing.

As shown in FIG. 13C a fixture includes a fixture 1325. The fixture 1325 includes a plurality of light fixtures 1305, the line voltage 10, ground GND, a line voltage connector 1330 and a ground connector 1335. The fixture 1325 is configured to allow a two wire (e.g., a standard two prong AC power cord common in most commercial or residential facilities) installation of a LED light fixture having some or all of the features discussed above. Alternatively (or in addition to), fixture 1325 can be configured to allow a three wire implementation (hot, neutral and ground).

Figure 14:
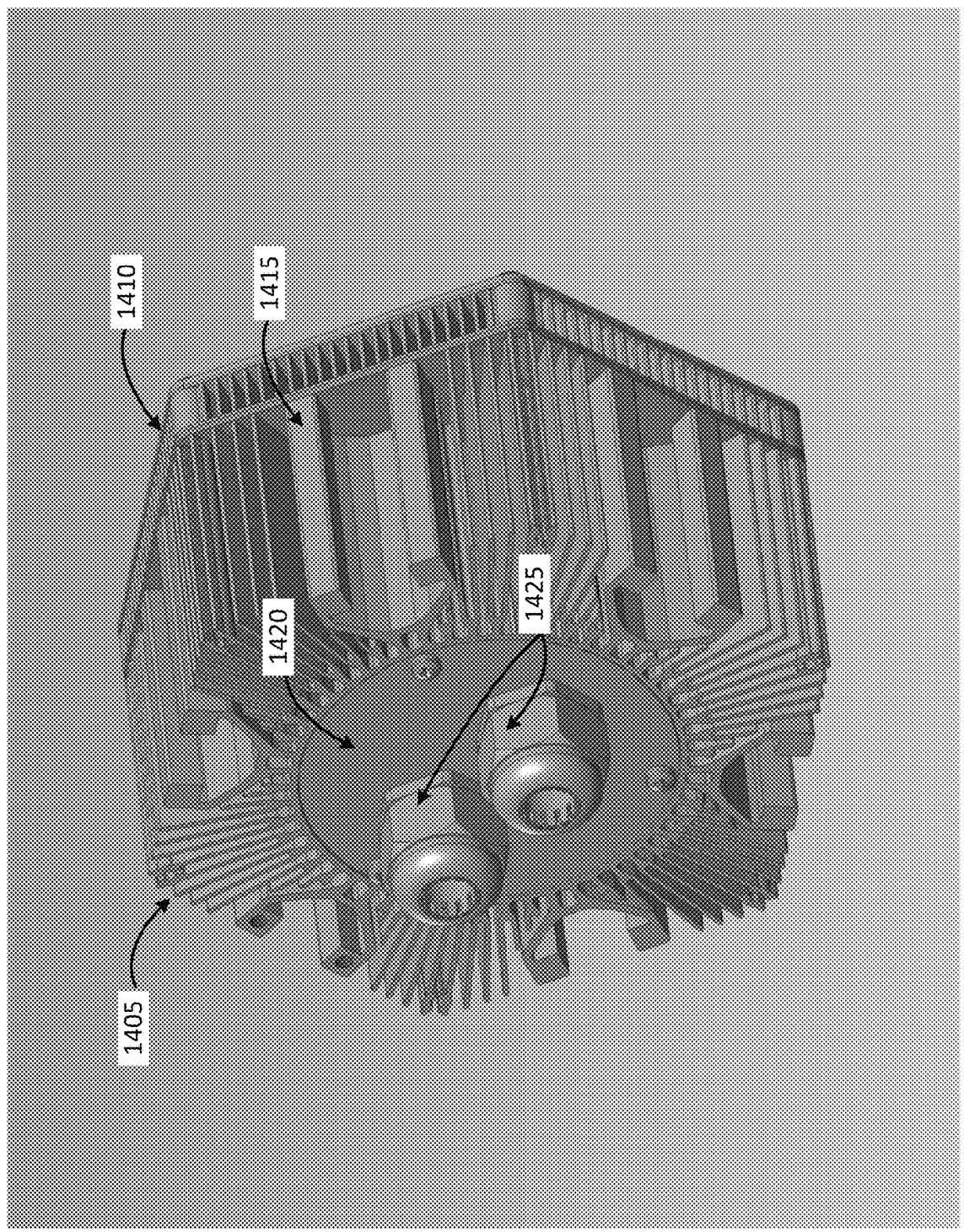
FIG. 14 illustrates a heat sink view of a modular LED fixture according to at least one example embodiment.

As shown in FIG. 14 a modular LED fixture can include a heat sink 1405 and a light assembly 1410 physically coupled to the heat sink 1405. The heat sink 1405 can include a receptacle 1415. The receptacle 1415 can be used to physically couple two or more modular LED fixtures. For example, a locking mechanism (described below) inserted into a receptacle 1415 of a first modular LED fixture and into a receptacle 1415 of a second modular LED fixture. The locking mechanism can be configured to provide a friction fit to couple the first modular LED fixture to the second modular LED fixture. The heat sink 1405 can include an access plate 1420 and at least one conduit fitting 1425. The access plate 1420 can provide access to a chamber (not shown) where electrical connections can be made to a circuit board (not shown). The circuit board can include components configured to control a light (e.g., a LED light). The light fixture 1305 can be included on (or as) the circuit board. Accordingly, the light assembly 1410 can include one or more of the components and features discussed above. For example, the light assembly can include elements and or components of the driver system 100.

The chamber can be relatively small in order to minimize the size of the modular LED fixture. For example, the chamber should not have enough space to include a power supply module. The chamber can have a diameter of less than 3 inches. Therefore, the modular LED fixture may not include a power supply module. The at least one conduit fitting 1425 can provide access through the access plate 1420 for power and/or control wires. The at least one conduit fitting 1425 and the access plate 1420 may be water tight.

Figure 15:
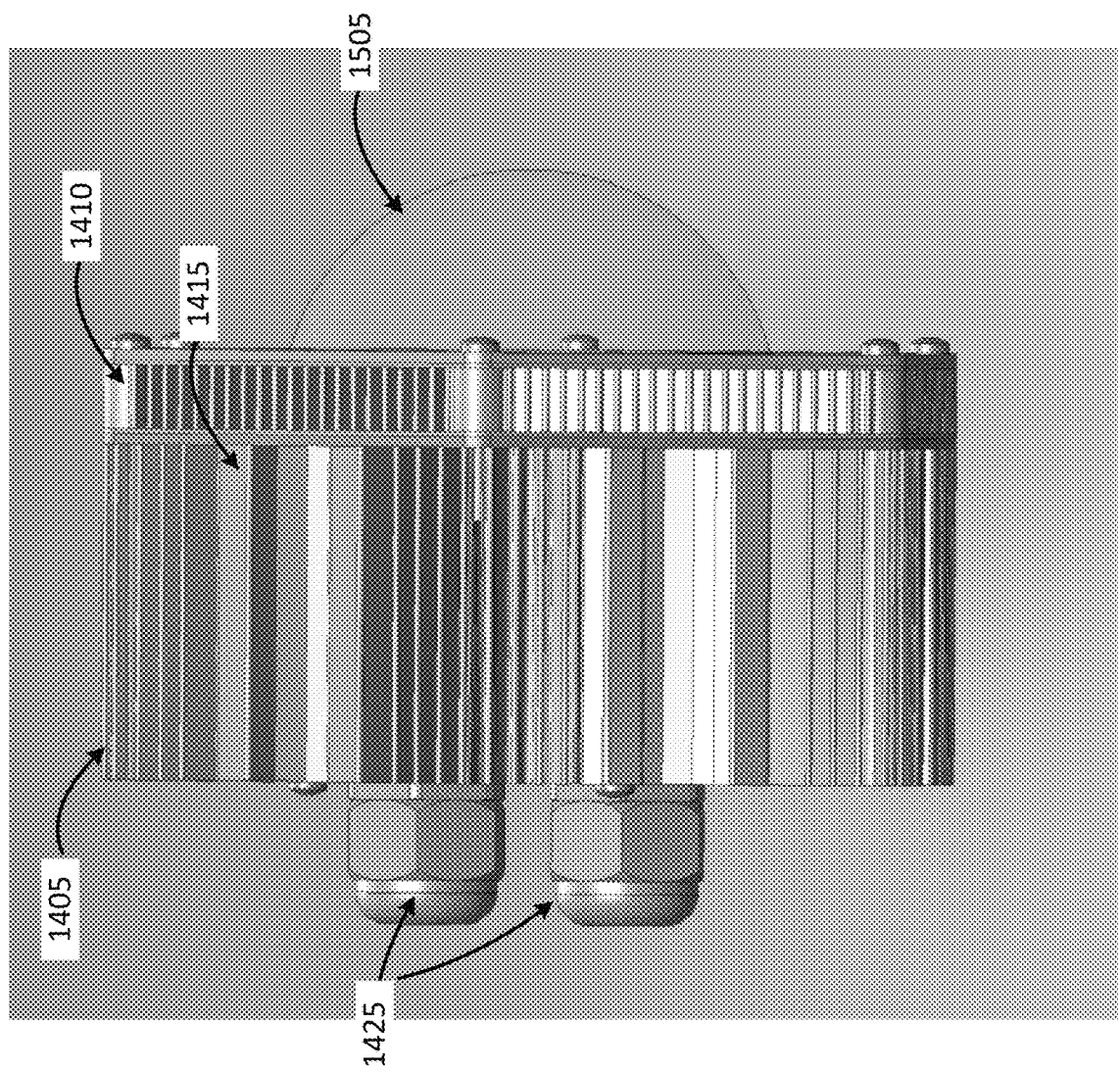
FIG. 15 illustrates a side view of a modular LED fixture according to at least one example embodiment.

As shown in FIG. 15, the light assembly 1410 can include a lens 1505. The lens 1505 can be constructed of glass, plastic or some other transparent or semi-transparent material. The lens 1505 can be coupled to the light assembly 1410 using a water tight gasket or gasket material.

Figure 16:
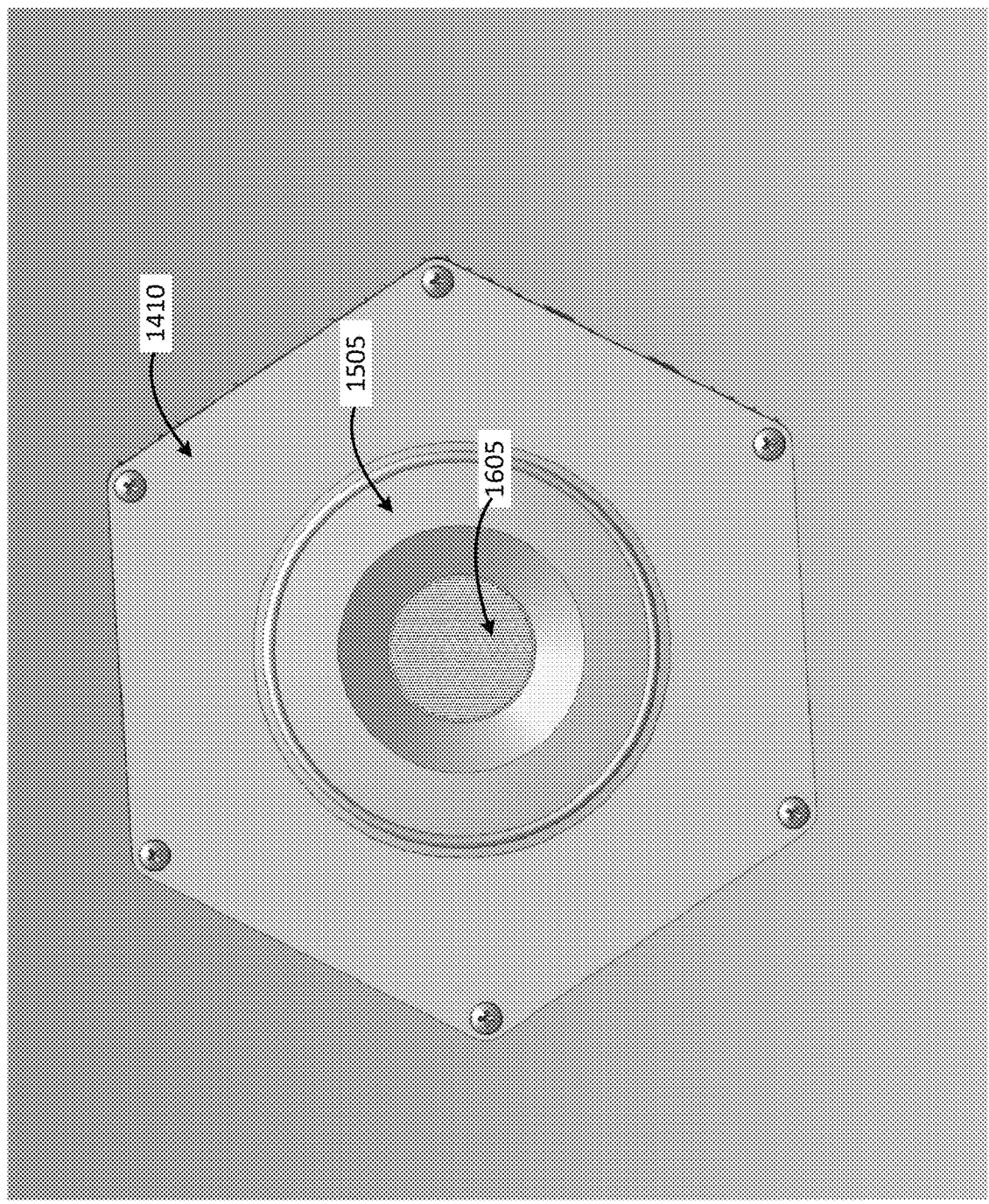
FIG. 16 illustrates a light emitting view of a modular LED fixture according to at least one example embodiment.

As shown in FIG. 16, the light assembly 1410 can include a LED light 1605. The LED light 1605 can be configured to emit blue light, red light, yellow light and the like based on the semi-conductor materials used to construct the LED. The LED light 1605 can be a string and/or mesh of LED's. The LED light 1605 shown has a yellow color. However, the LED light 1605 can use an array of blue LED lights under a phosphor filled resin. The array of LED lights plus the phosphor can mask the failure of any individual LED and/or the decision to illuminate only a subset of those LED lights.

Figure 17:
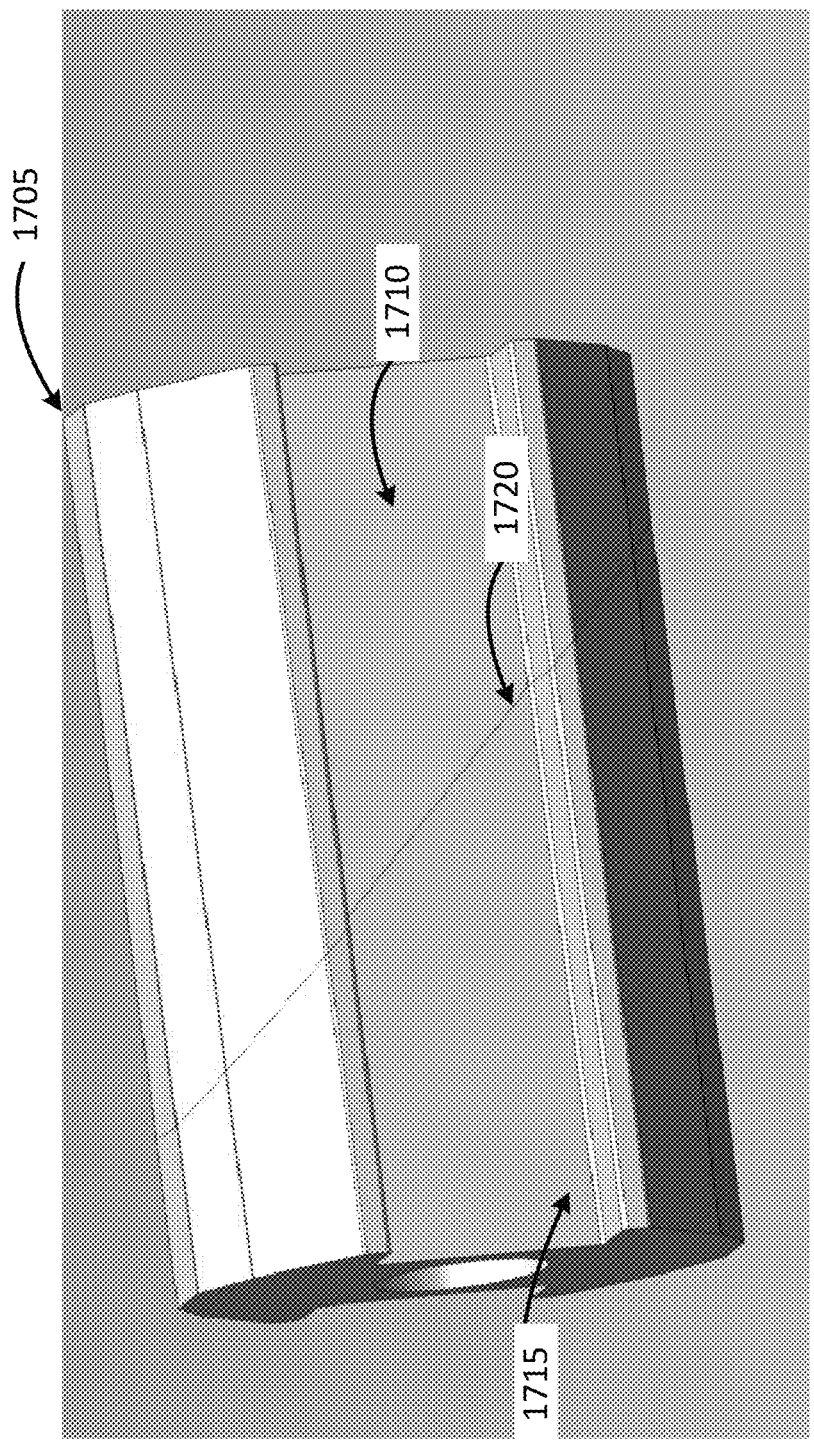
FIG. 17 illustrates a side view of a locking mechanism according to at least one example embodiment.
Figure 18:
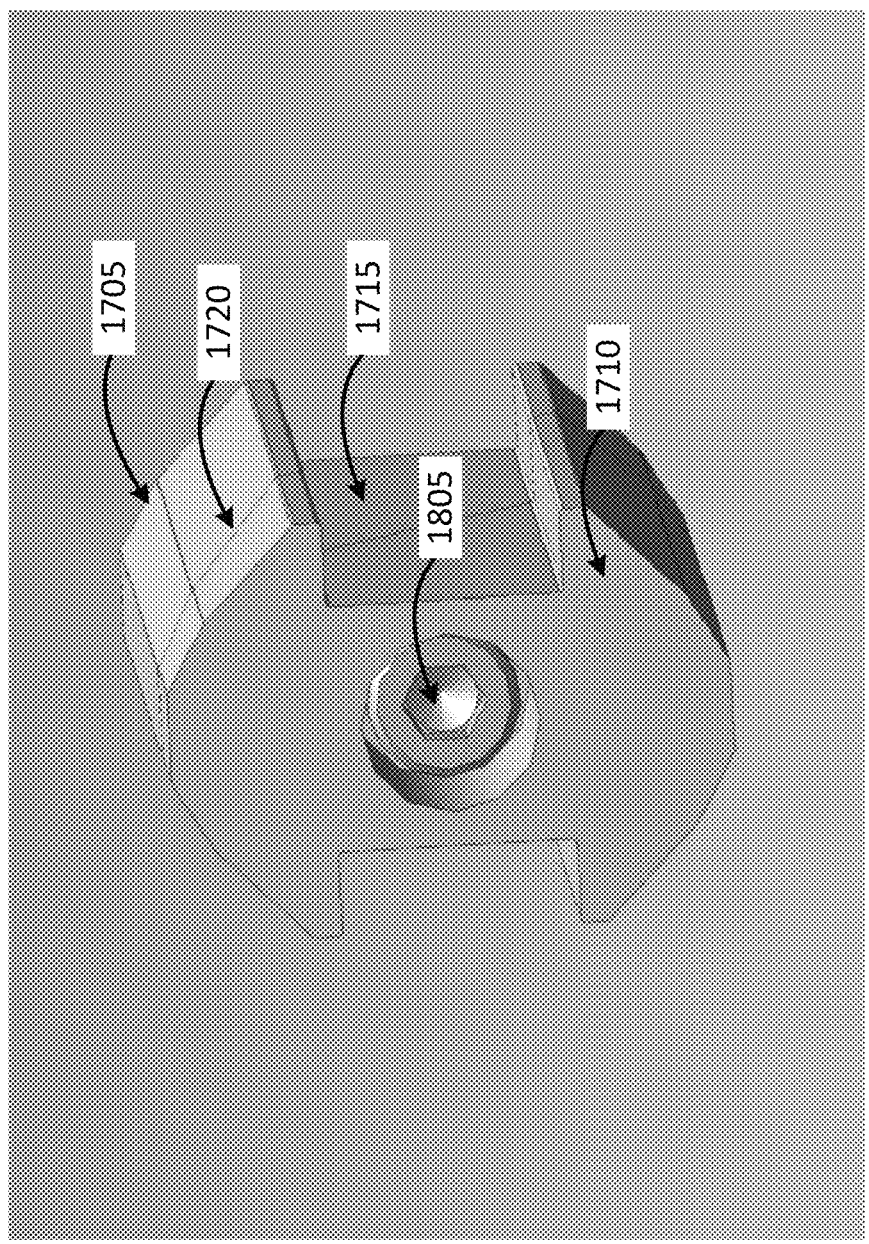
FIG. 18 illustrates a top view of a locking mechanism according to at least one example embodiment.
Figure 19:
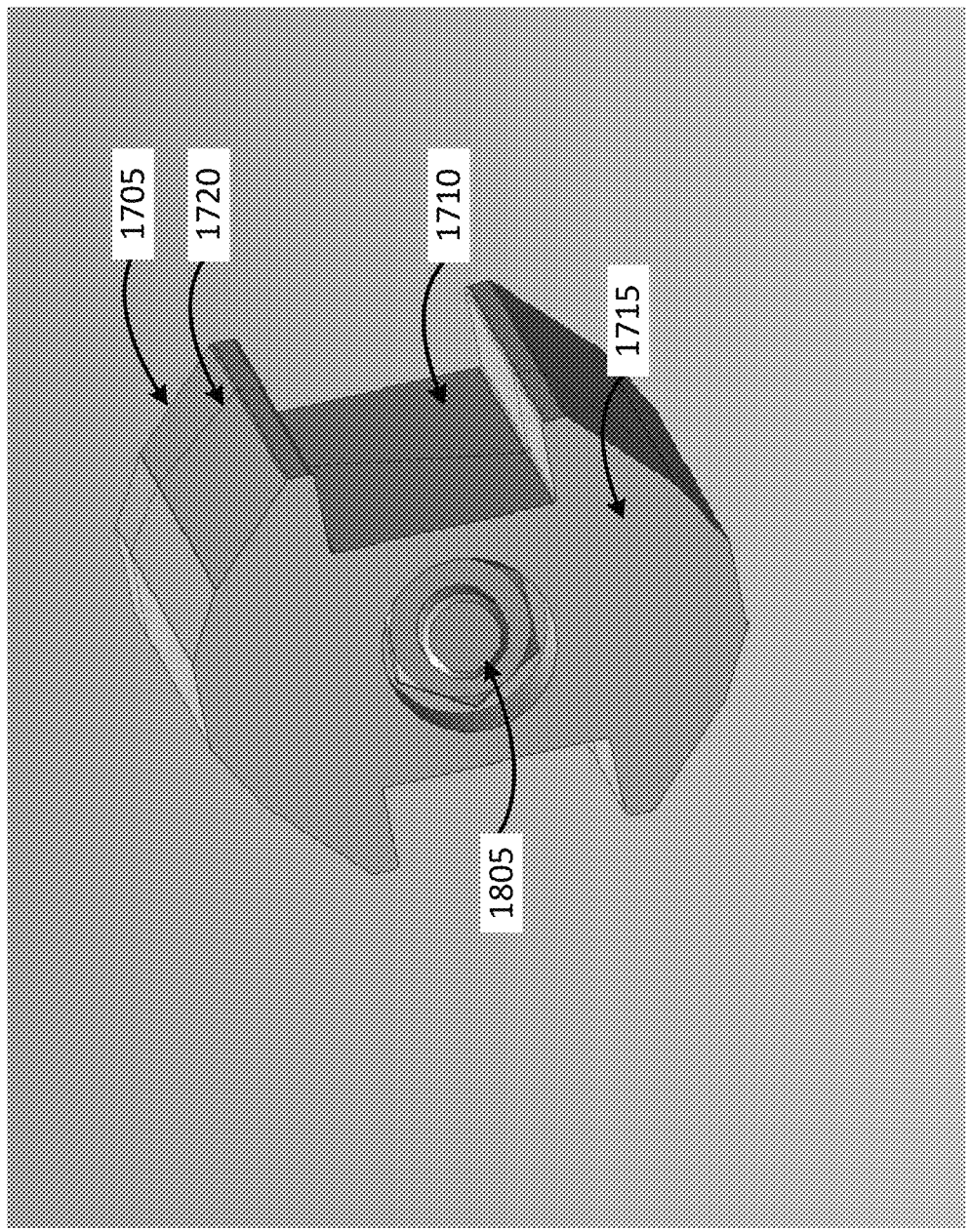
FIG. 19 illustrates a bottom view of a locking mechanism according to at least one example embodiment.
Figure 20A:
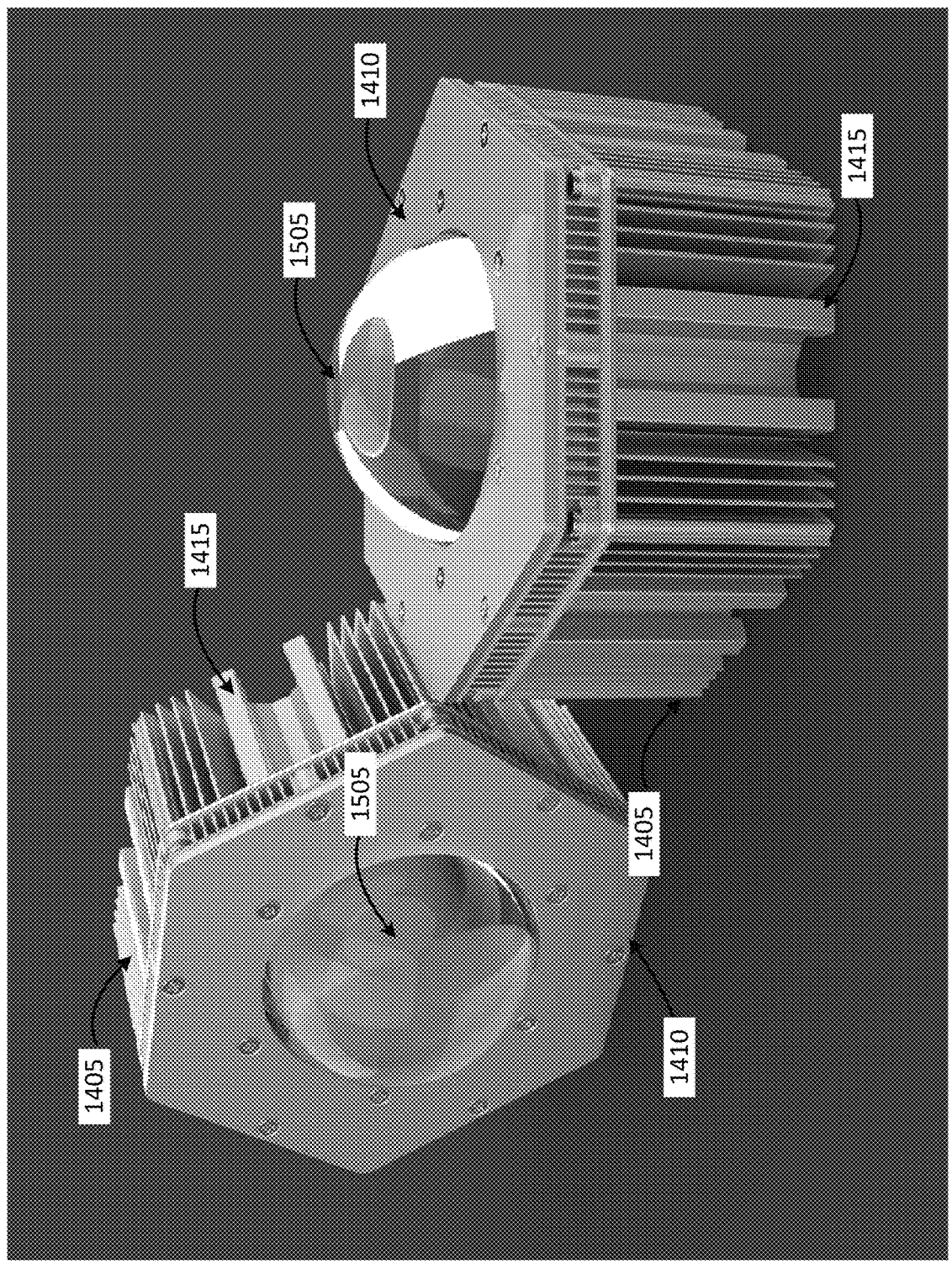
FIGS. 20A-20F illustrate various views of the modular LED fixture according to at least one example embodiment.
Figure 20B:
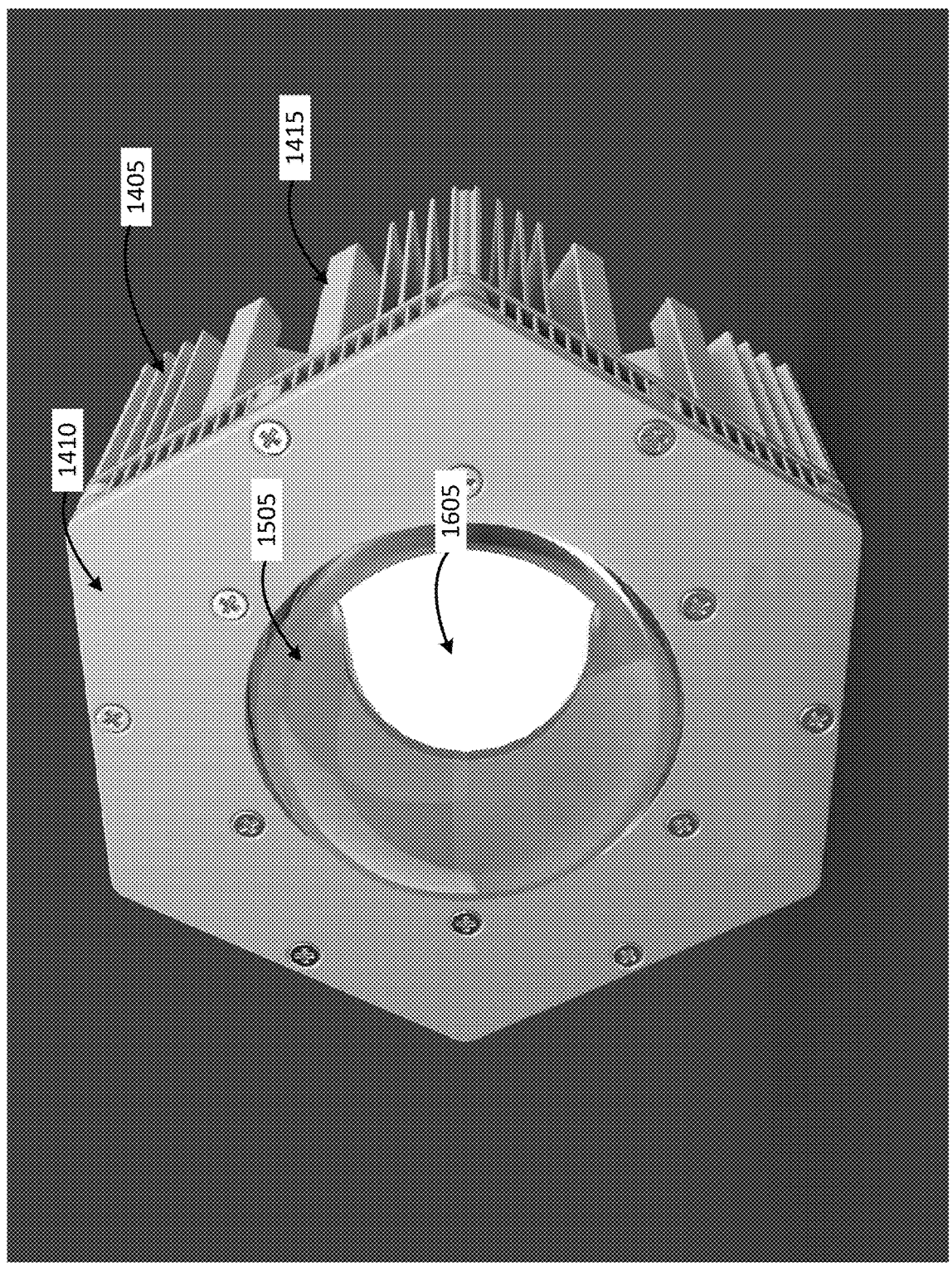
Figure 20C:
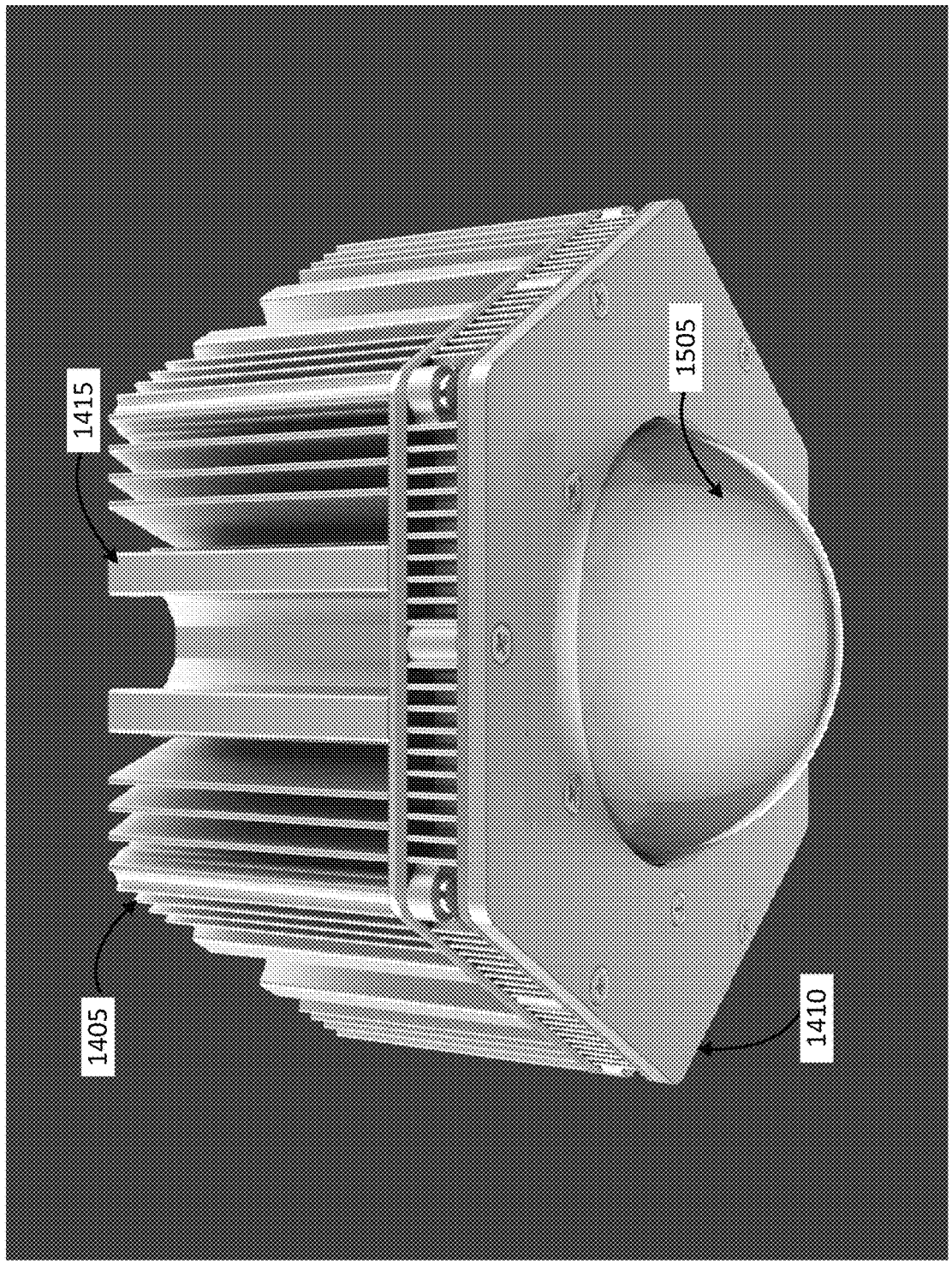
Figure 20D:
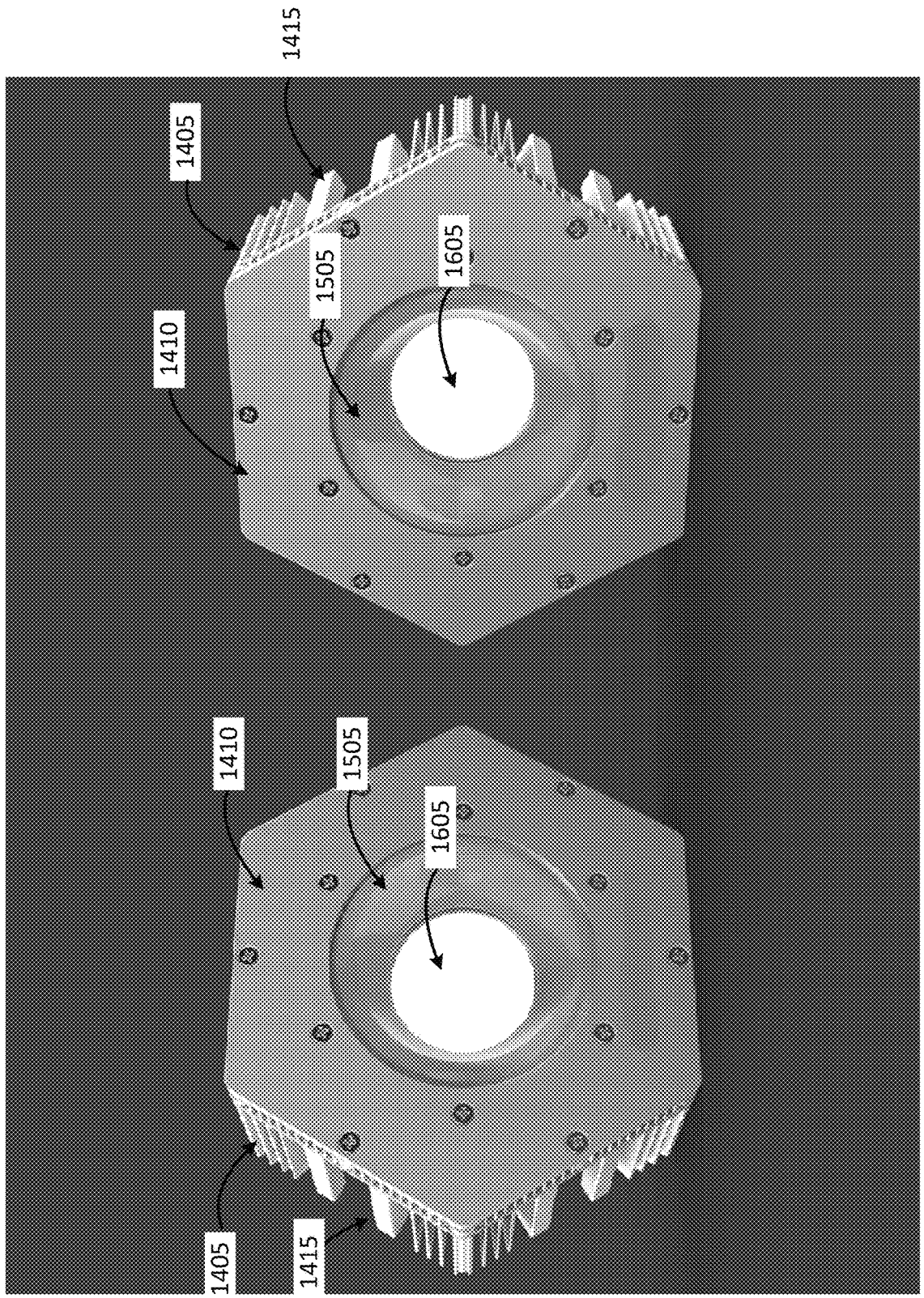
Figure 20E:
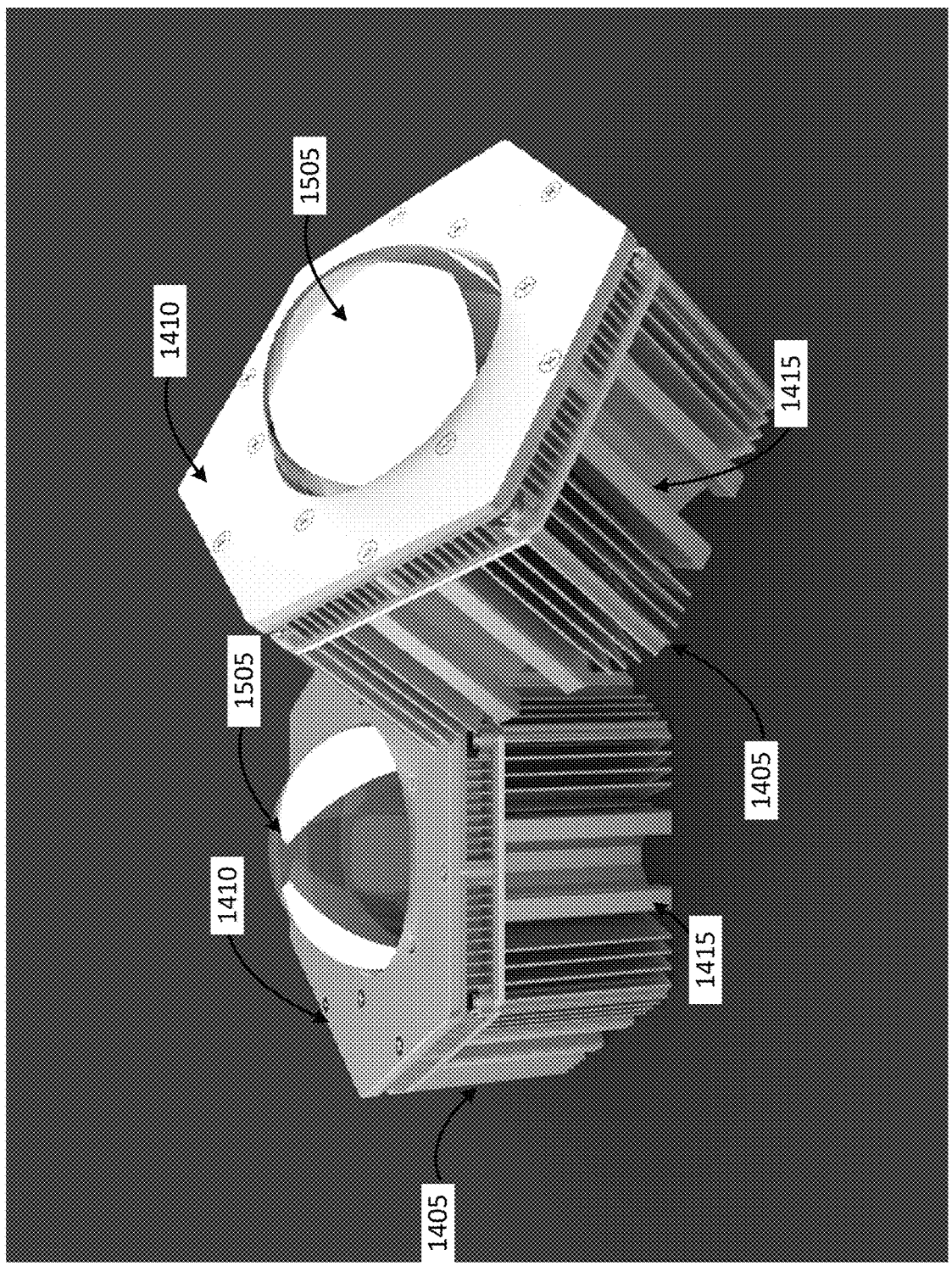
Figure 20F:
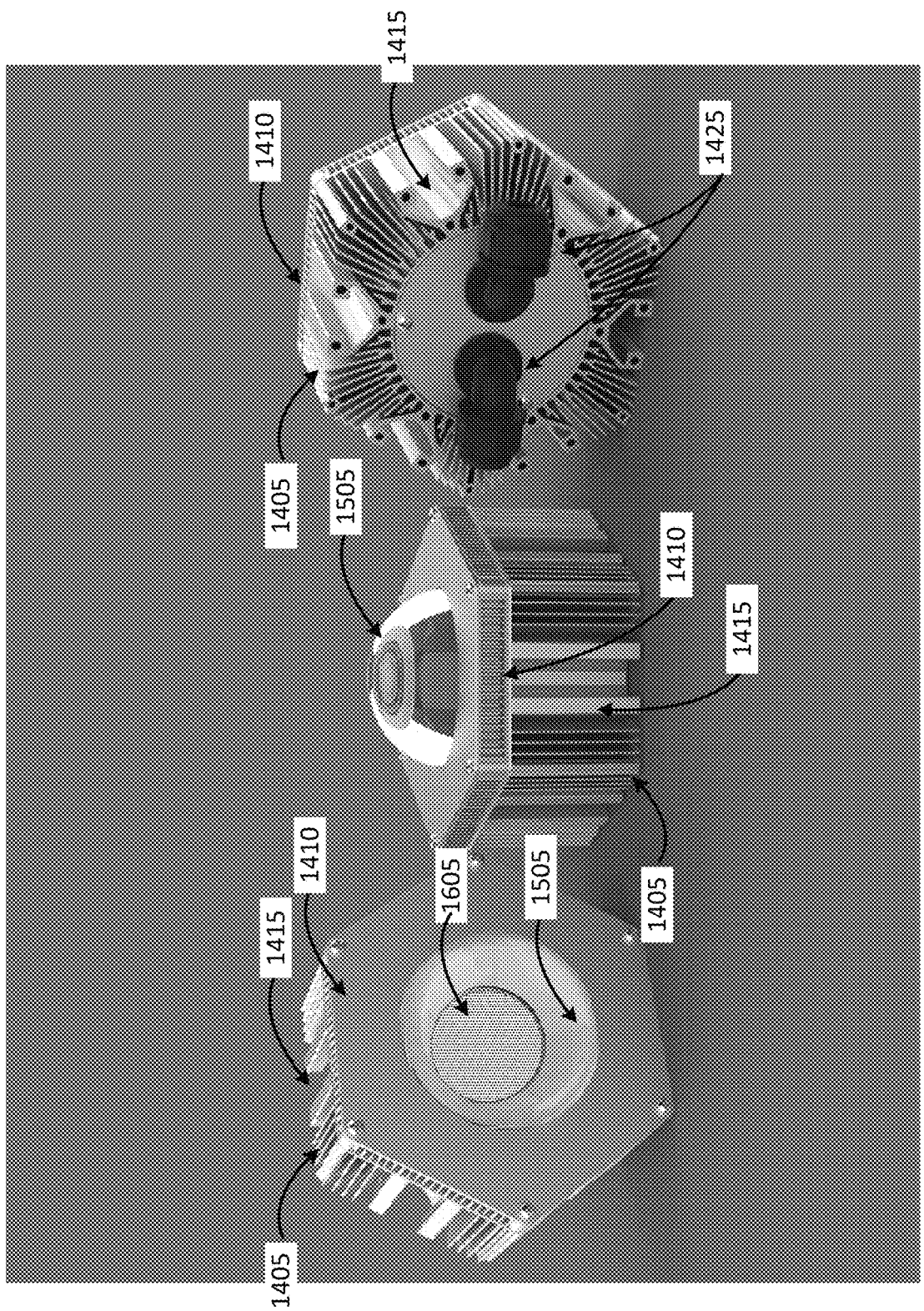

FIGS. 17, 18 and 19 illustrate views of a locking mechanism 1705. The locking mechanism 1705 can include a first portion 1710 and a second portion 1715. Line 1720 represents a mating of the first portion 1710 and a second portion 1715. The locking mechanism 1705 can be configured to be inserted into a receptacle 1415 of a first modular LED fixture and into a receptacle 1415 of a second modular LED fixture. The locking mechanism can be configured to provide a friction fit to couple the first modular LED fixture to the second modular LED fixture. For example, the locking mechanism 1705 can include a fastener 1805. When the fastener 1805 is rotated, the first portion 1710 and the second portion 1715 can move relative to each other (e.g., line 1720) such that the locking mechanism 1705 provides a friction fit to couple two or more modular LED fixtures together. For example, the first portion 1710 and the second portion 1715 can rotate relative to each other. In an example implementation, the first portion 1710 can rotate clockwise and the second portion 1715 can rotate counter-clockwise. In another implementation, the first portion 1710 and the second portion 1715 can directionally shift causing the locking mechanism 1705 to expand.

Figure 21:
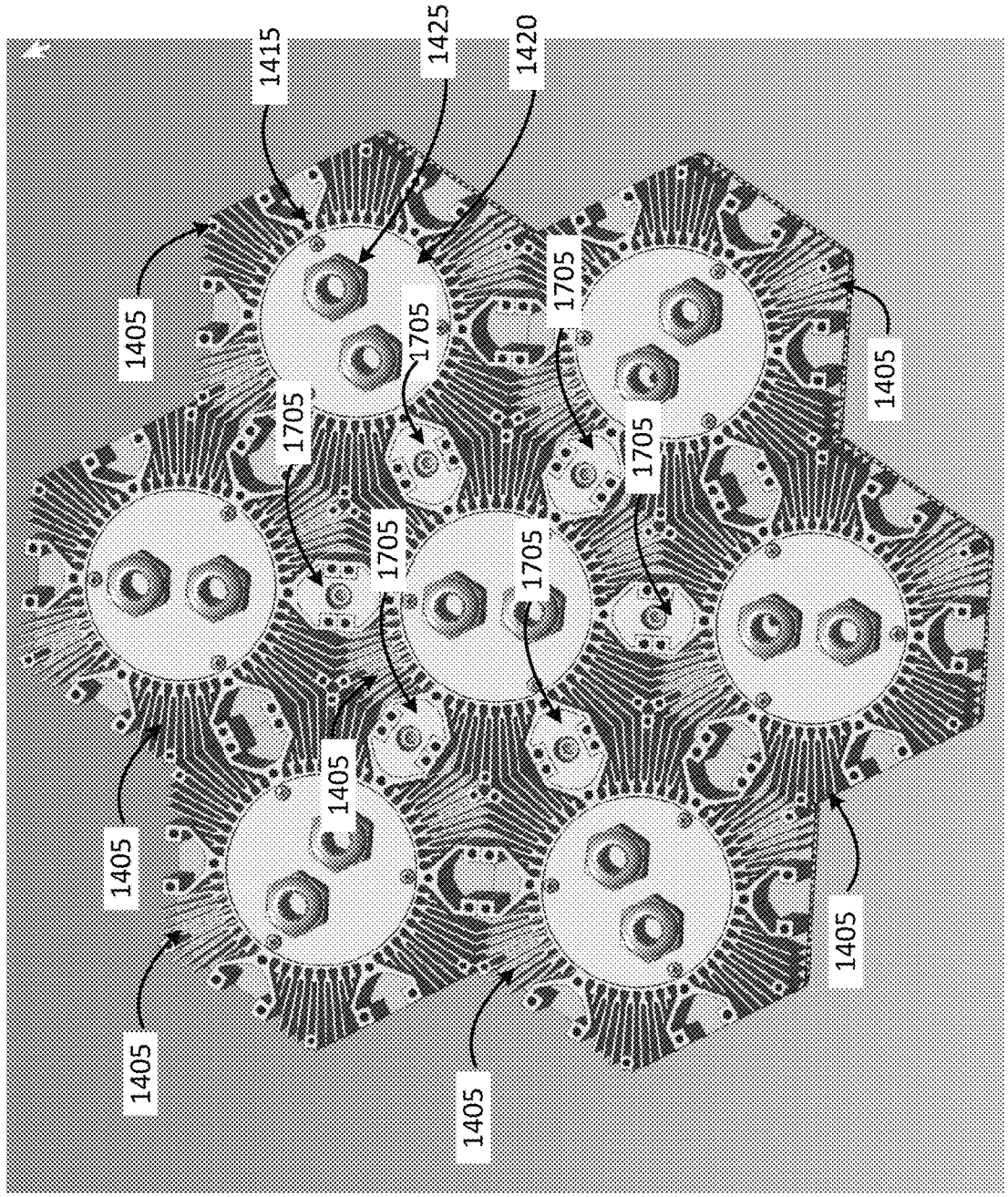
FIG. 21 illustrates a heat sink view of a LED fixture including a plurality of modular LED fixtures according to at least one example embodiment.
Figure 22:
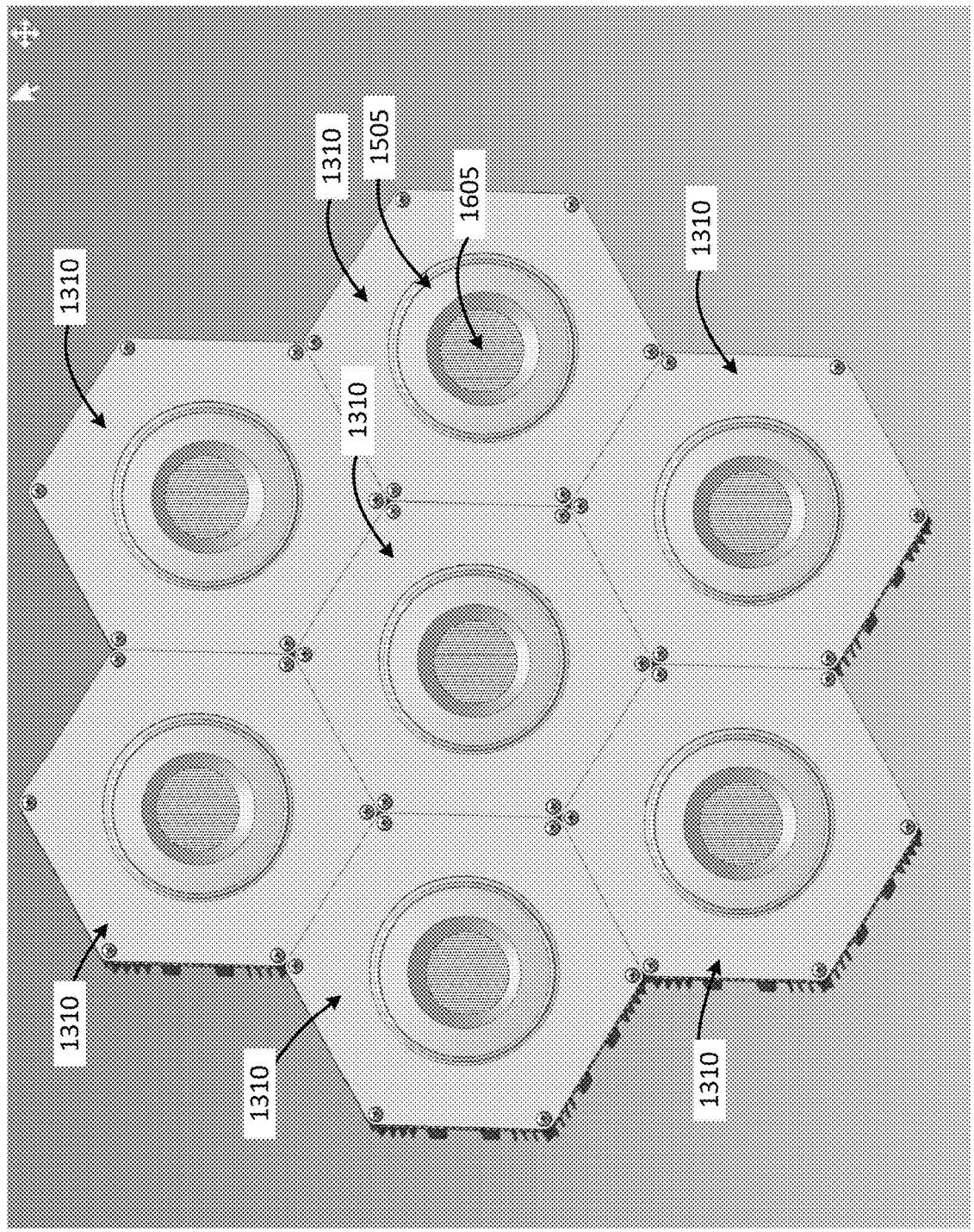
FIG. 22 illustrates a light emitting view of a LED fixture including a plurality of modular LED fixtures according to at least one example embodiment.

FIGS. 20A-20F illustrate various views of the modular LED fixture. Each feature shown in FIGS. 20A-20F are described above with regard to FIGS. 14-16. FIGS. 21 and 22 illustrate a heat sink view of a LED fixture including a plurality of modular LED fixtures and a light emitting view of a LED fixture including a plurality of modular LED fixtures, respectively. The plurality of modular LED fixtures can be physically coupled using the locking mechanism 1705. Other configurations of modular LED fixtures can form the LED fixture. For example, a straight line configuration of modular LED fixtures can be used.

In a use case with LED fixture including a plurality of modular LED fixtures each heat sink 1405 can be electrically coupled and configured to provide a common ground for the plurality of modular LED fixtures. In a use case with LED fixture including a plurality of modular LED fixtures each heat sink 1405 can be substantially thermally isolated from each other. In a use case with LED fixture including a plurality of modular LED fixtures, each of the plurality of modular LED fixtures can be field replaceable within the LED fixture. In a use case with LED fixture including a plurality of modular LED fixtures, the LED fixture can be configured to operate at least 15 watts. In a use case with LED fixture including a plurality of modular LED fixtures, the LED fixture can include a DC storage device configured to reduce flicker. In a use case with LED fixture including a plurality of modular LED fixtures, the LED of each of the plurality of modular LED fixtures can be individually controlled from a single source.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

What is claimed is:

1. A driver system for controlling a load including a plurality of light emitting diodes (LED), the driver system comprising:
   a timing circuit configured to generate time-off switching points and time-on switching points;
   an encoder configured to:
      generate a load voltage by modifying a rectified line voltage using the time-off switching points and the time-on switching points; and
   a configuration switching circuit configured to:
      determine a maximum voltage of a line voltage input to the driver system,
      select a configuration for the plurality of LEDs based on the maximum voltage, the configuration including at least one of a first quantity of LEDs in electrically coupled in series and a second quantity of LEDs electrically coupled in parallel,
      communicate the configuration for the plurality of LEDs to the load,
      dynamically reconfigure the configuration for the plurality of LEDs based on the modified rectified line voltage, the dynamically reconfiguration of the configuration including changing at least one of the first quantity of LEDs in electrically coupled in series and the second quantity of LEDs electrically coupled in parallel, and
      communicate the reconfigured configuration for the plurality of LEDs to the load during at least one cycle of the rectified line voltage.

2. The driver system of claim 1, further comprising:
   a direct current (DC) source electrically coupled to the load voltage, wherein the DC source is configured to prevent flicker by maintaining the load voltage above a turn-on voltage of the plurality of LEDs.

3. The driver system of claim 1, further comprising:
   a direct current (DC) source electrically coupled to the load voltage; and
   an AC-DC converter configured to charge the DC source using the load voltage during a reconfiguration of the plurality of LEDs.

4. The driver system of claim 1, further comprising:
   a sensor circuit configured to detect a voltage level associated with at least one of the line voltage and the rectified line voltage and communicate the detected voltage level to the encoder, wherein
   the encoder dynamically regenerates the time-off switching points and the time-on switching points based on the detected voltage level.

5. The driver system of claim 1, further comprising:
   a sensor circuit configured to detect a voltage level associated with at least one of the line voltage and the rectified line voltage and communicate the detected voltage level to the configuration switching circuit, wherein
   the configuration switching circuit dynamically reconfigures the configuration for the plurality of LEDs based on the detected voltage level.

6. The driver system of claim 1, further comprising:
   a look-up table; and
   a sensor circuit configured to detect a voltage level associated with at least one of the line voltage and the rectified line voltage and communicate the detected voltage level to the configuration switching circuit, wherein
   the configuration switching circuit stores the detected voltage level in the look-up table.

7. The driver system of claim 1, further comprising:
   a look-up table stored a plurality of voltage levels associated with at least one of the line voltage and the rectified line voltage, wherein
   the configuration switching circuit dynamically reconfigures the configuration for the plurality of LEDs based on the stored plurality of voltage levels.

8. The driver system of claim 1, further comprising:
   a control signal generation circuit configured to receive a signal indicating a variable light output setting and communicate a control signal to the timing circuit, wherein
   the control signal causes the timing circuit to one of,
      generate additional off periods to reduce power associated with the load voltage, the reduced power causing the plurality of LEDs to dim,
      generate longer off periods to reduce power associated with the load voltage, the reduced power causing the plurality of LEDs to dim,
      remove off periods to increase power associated with the load voltage, the increased power causing the plurality of LEDs to get brighter, and
      generate shorter off periods to increase power associated with the load voltage, the increased power causing the plurality of LEDs to get brighter.

9. The driver system of claim 1, further comprising:
   a control signal generation circuit configured to:
      receive a signal indicating an environmental lighting condition,
      generate a control signal based on the environmental lighting condition, and
      communicate the control signal to the timing circuit, wherein
   the control signal causes the timing circuit to one of,
      generate additional off periods to reduce power associated with the load voltage, the reduced power causing the plurality of LEDs to dim,
      generate longer off periods to reduce power associated with the load voltage, the reduced power causing the plurality of LEDs to dim,
      remove off periods to increase power associated with the load voltage, the increased power causing the plurality of LEDs to get brighter, and
      generate shorter off periods to increase power associated with the load voltage, the increased power causing the plurality of LEDs to get brighter.

10. The driver system of claim 1, further comprising:
    a control signal generation circuit configured to receive a signal indicating a thermal overload condition and communicate a control signal to the timing circuit, wherein
    the control signal causes the timing circuit to at least one of,
       generate additional off periods to reduce power, and
       generate longer off periods to reduce power.

11. The driver system of claim 1, further comprising:
a direct current (DC) lighting circuit configured to switch the load voltage between the line voltage and a DC line voltage, wherein the configuration switching circuit is further configured to:
dynamically reconfigure the configuration for the plurality of LEDs to reduce a quantity of enabled LEDs to a minimum quantity of LEDs for safe visibility.

12. A driver system for controlling a load including a plurality of light emitting diodes (LED), the driver system comprising:
a drive circuit generate a load voltage by rectifying a line voltage; and
a configuration switching circuit configured to:
determine a voltage profile of the line voltage based on a voltage level of the line voltage and a frequency of the line voltage,
select a configuration for the plurality of LEDs based on the voltage level, the configuration including at least one of a first quantity of LEDs in electrically coupled in series and a second quantity of LEDs electrically coupled in parallel,
communicate the configuration for the plurality of LEDs to the load,
dynamically reconfigure the configuration for the plurality of LEDs based on the voltage profile, the dynamic reconfiguration of the configuration including at least one of,
enabling or disabling one or more of the plurality of LEDs,
changing at least one of the first quantity of LEDs in electrically coupled in series and the second quantity of LEDs electrically coupled in parallel, and
communicate the reconfigured configuration for the plurality of LEDs to the load during at least one cycle of the rectified line voltage.

13. The driver system of claim 12, further comprising:
a direct current (DC) source electrically coupled to the load voltage, wherein the DC source is configured to prevent flicker by maintaining the load voltage above a turn-on voltage of the plurality of LEDs.

14. The driver system of claim 12, further comprising:
a direct current (DC) source electrically coupled to the load voltage; and
an AC-DC converter configured to charge the DC source using the load voltage during a reconfiguration of the plurality of LEDs.

15. The driver system of claim 12, further comprising:
a sensor circuit configured to detect a voltage level associated with at least one of the line voltage and the rectified line voltage and communicate the detected voltage level to the encoder, wherein
the encoder dynamically regenerates the time-off switching points and the time-on switching points based on the detected voltage level.

16. The driver system of claim 12, further comprising:
a sensor circuit configured to detect a voltage level associated with at least one of the line voltage and the rectified line voltage and communicate the detected voltage level to the configuration switching circuit, wherein
the configuration switching circuit dynamically reconfigures the configuration for the plurality of LEDs based on the detected voltage level.

17. The driver system of claim 12, further comprising:
a look-up table; and
a sensor circuit configured to detect a voltage level associated with at least one of the line voltage and the rectified line voltage and communicate the detected voltage level to the configuration switching circuit, wherein
the configuration switching circuit stores the detected voltage level in the look-up table.

18. The driver system of claim 12, further comprising:
a look-up table stored a plurality of voltage levels associated with at least one of the line voltage and the rectified line voltage, wherein
the configuration switching circuit dynamically reconfigures the configuration for the plurality of LEDs based on the stored plurality of voltage levels.

* * * * *